(12) United States Patent
Taylor et al.

(10) Patent No.: US 7,283,127 B2
(45) Date of Patent: *Oct. 16, 2007

(54) STYLUS INPUT DEVICE UTILIZING A PERMANENT MAGNET

(75) Inventors: Brian Taylor, Salt Lake City, UT (US);
Richard Woolley, Orem, UT (US);
Paul Glad, Taylorsville, UT (US);
Daniel Lee, Salt Lake City, UT (US);
Michael Harney, Layton, UT (US);
Benjamin Gyori, Farmington, UT (US)

(73) Assignee: Cirque Corporation, Salt Lake City, UT (US)

( * ) Notice: Subject to any disclaimer, the term of this patent is extended or adjusted under 35 U.S.C. 154(b) by 175 days.

This patent is subject to a terminal disclaimer.

(21) Appl. No.: 10/881,804

(22) Filed: Jun. 30, 2004

(65) Prior Publication Data

US 2005/0083316 A1    Apr. 21, 2005

(51) Int. Cl.
*G09G 5/00*    (2006.01)
(52) U.S. Cl. ............... 345/173; 178/18.01; 178/19.01
(58) Field of Classification Search ............... 345/179, 345/182; 178/18.01, 18.02, 18.03, 18.1, 178/19.01
See application file for complete search history.

(56) References Cited

U.S. PATENT DOCUMENTS

| 4,670,751 | A | * | 6/1987 | Enokido et al. .......... 178/19.01 |
| 4,688,933 | A | * | 8/1987 | Lapeyre ..................... 356/3.16 |
| 4,695,680 | A | * | 9/1987 | Kable ..................... 178/19.01 |
| 4,711,977 | A | | 12/1987 | Miyamori et al. |
| 4,806,707 | A | | 2/1989 | Landmeier |
| 5,023,408 | A | | 6/1991 | Murakami et al. |
| RE33,936 | E | | 5/1992 | Miyamori et al. |
| 5,134,388 | A | | 7/1992 | Murakami et al. |
| 5,159,321 | A | | 10/1992 | Masaki et al. |
| 5,290,972 | A | | 3/1994 | Someya et al. |
| 5,291,213 | A | | 3/1994 | Krauss |
| 5,525,764 | A | * | 6/1996 | Junkins et al. .......... 178/18.01 |
| 5,534,893 | A | | 7/1996 | Hansen, Jr. et al. |
| RE35,329 | E | | 9/1996 | Murakami et al. |
| 5,654,529 | A | * | 8/1997 | Yeung et al. ............ 178/19.03 |
| 5,717,168 | A | * | 2/1998 | DeBuisser et al. ....... 178/18.04 |
| 5,793,360 | A | | 8/1998 | Fleck et al. |
| 5,834,709 | A | * | 11/1998 | Blonder et al. .......... 178/18.05 |
| 5,914,708 | A | | 6/1999 | LaGrange et al. |
| 5,945,981 | A | | 8/1999 | Paull et al. |
| 5,973,677 | A | | 10/1999 | Gibbons |
| 5,995,084 | A | | 11/1999 | Chan et al. |
| 6,002,799 | A | | 12/1999 | Sklarew |
| 6,046,733 | A | | 4/2000 | Challener et al. |
| 6,118,437 | A | | 9/2000 | Fleck et al. |

(Continued)

*Primary Examiner*—Kent Chang
(74) *Attorney, Agent, or Firm*—Morriss O'Bryant Compagni

(57) ABSTRACT

A stylus that operates utilizing magnetic fields, wherein a permanent magnet is disposed within a passive stylus that is detectable by a plurality of magnetic sensors that remove the magnetic field of the stylus from the earth's relative magnetic field to thereby obtain vectors that are used in a triangulation equation to determine the location of the stylus in two or three dimensions, depending upon the number of magnetic sensors that are used, wherein one set of magnetic sensors can be used as a reference for earth's magnetic field, and wherein each of the magnetic sensors includes a polarizing coil to change direction of sensitivity, a null coil and a flipping coil.

27 Claims, 16 Drawing Sheets

U.S. PATENT DOCUMENTS

| | | | |
|---|---|---|---|
| 6,128,007 A | * 10/2000 | Seybold | 345/179 |
| 6,154,200 A | 11/2000 | Challener et al. | |
| 6,204,457 B1 | 3/2001 | Shekhel et al. | |
| 6,295,372 B1 | 9/2001 | Hawkins et al. | |
| 6,326,945 B1 | * 12/2001 | Williams, III | 345/111 |
| 6,337,698 B1 | 1/2002 | Keely, Jr. et al. | |
| 6,466,200 B1 | 10/2002 | Anton et al. | |

* cited by examiner

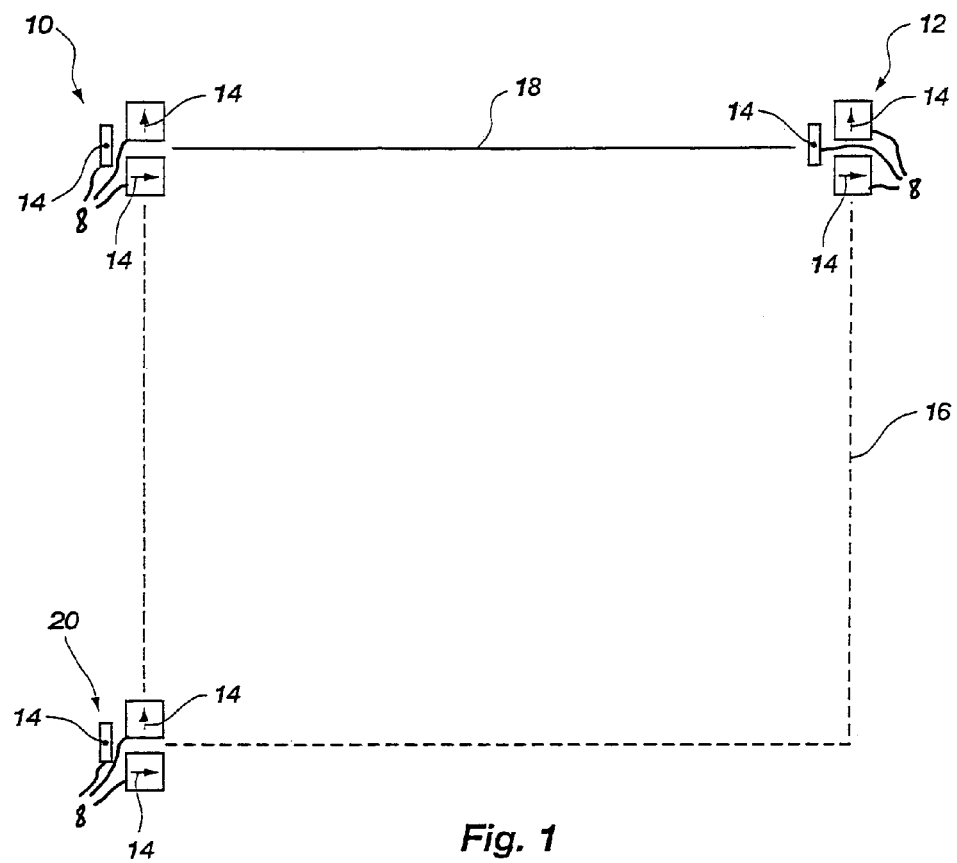
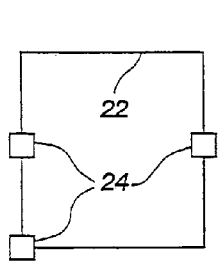
Fig. 2A
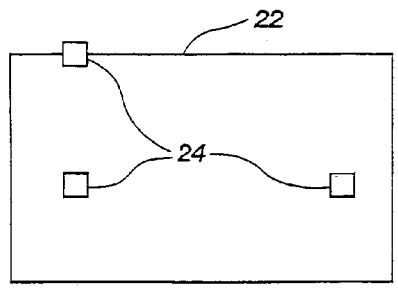
Fig. 2B
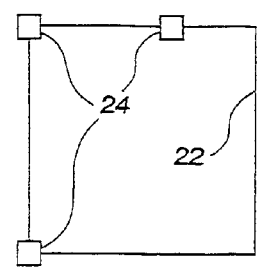
Fig. 2C

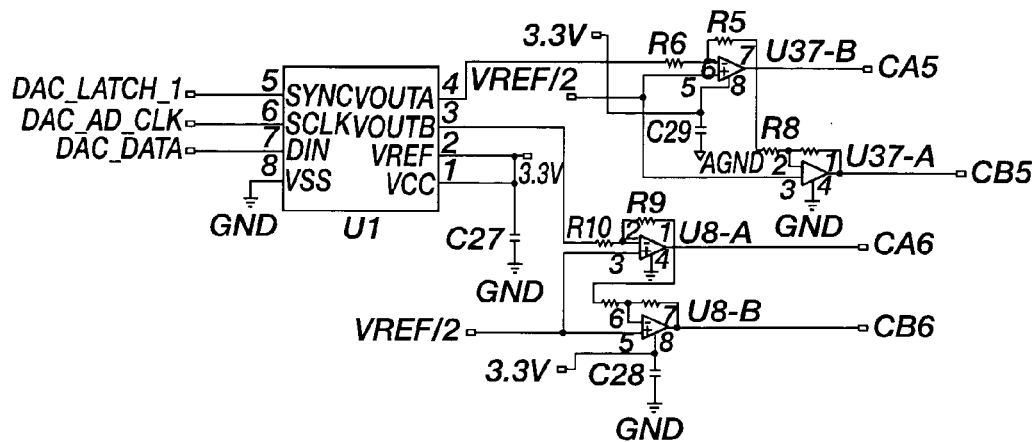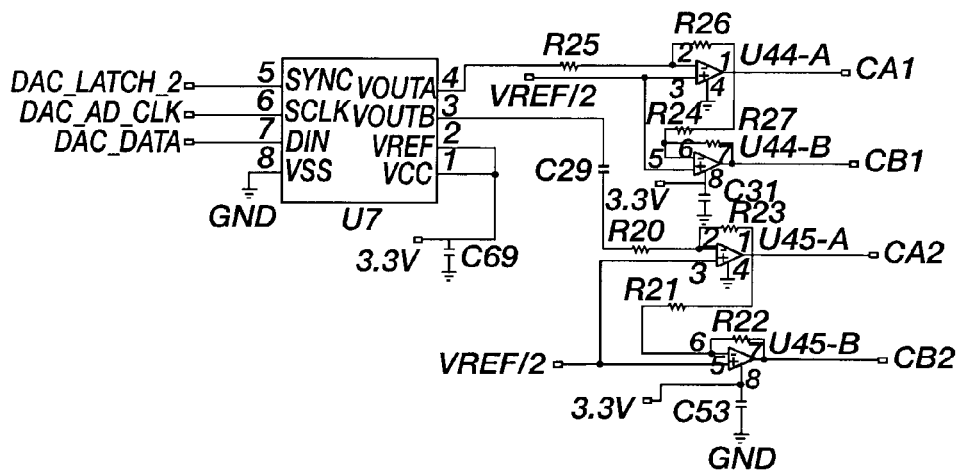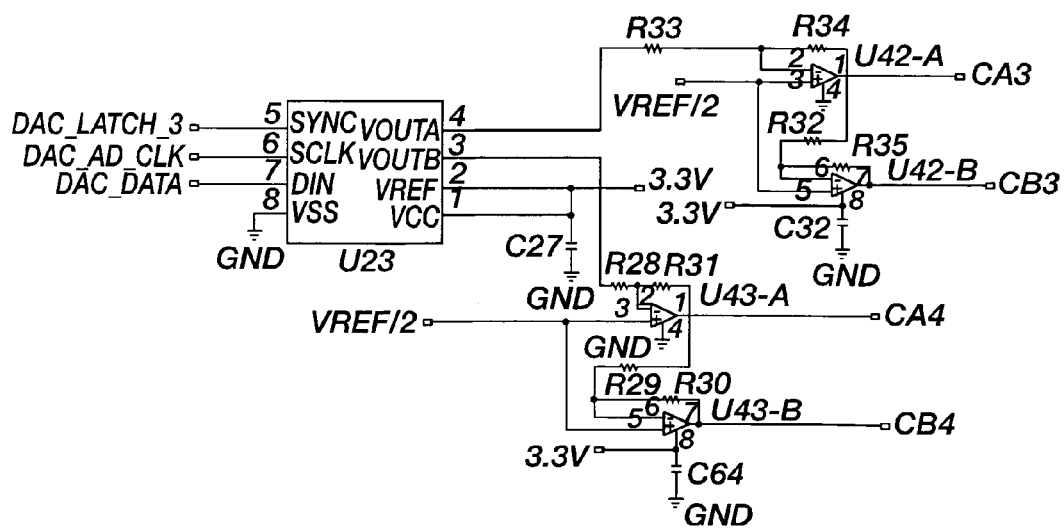
*FIG. 24*

STYLUS INPUT DEVICE UTILIZING A PERMANENT MAGNET

CROSS REFERENCE

This application claims priority to a co-pending application Ser. No. 09/993,394, filed Mar. 22, 2002.

BACKGROUND

1. The Field of the Invention

This invention relates generally to input devices for electronic information devices. More specifically, the present invention provides a sensing system and a stylus that is operable in two or three dimensions, and which is utilized to provide input such as lines that represent movement of the stylus within a field of operation, or cursor control for computers and portable information appliances such as laptops, PC tablets, personal digital assistants (PDAs) or other types of electronic appliances such as mobile telephones.

2. Background of the Invention

The state of the art of input devices utilizing a stylus is generally characterized by digitizing tablets or a touchpad. A digitizing tablet is generally a large surface that is used to input data with a stylus that is coupled to the tablet or touchpad. For example, a cable connects the stylus to the tablet, and movement of the stylus is detected or tracked as it moves across the surface of the tablet. The movement is typically portrayed as lines on a display.

The basis of operation for most stylus-based tablets is reliance upon electromagnetic sensors. A magnetic field is formed by electric current that is flowing in a loop. The pen has a coil that picks up this magnetic field and sends it back to a convertor that determines the X and Y position from this data. This type of pen generally requires a tether between the pen and a base device to transfer the data, or the use of an active pen that is battery powered and generates some type of signal that is detectable by the touchpad.

It would therefore be an advantage over the prior art to provide a pen or stylus-based system for data input or cursor control which does not require a tethered stylus or an active pen. It would also be advantageous if the stylus did not require an internal power source to operate.

The prior art also describes using a stylus with personal digital assistants (PDAs). When a stylus requires pressure in order to be detectable, the writing surface of the PDA can be damaged. In addition, the writing area for the stylus is typically very small. It is also difficult to use a stylus when there is no visual feedback or "inking trail" to show the writer what has been written. Inking can also be difficult if there is a delay between stylus movement and the appearance on a display screen of what is being written.

Accordingly, it would be an advantage over the prior art to provide an off-screen inking surface to prevent damage to a PDA screen. It would also be an advantage to provide a larger writing surface for the PDA, as well as visual feedback that is rapid.

The prior art also fails to teach any type of stylus which can operate without making contact with a surface that can detect the presence of the stylus. In other words, the surface being written on is some surface that is capable of detecting the stylus. Accordingly, it would be an advantage to be able to detect and track movement of a stylus on a surface, where the surface is not a stylus detection surface.

The prior art also teaches that some type of sensing surface must be used with a stylus. Accordingly, it would be an advantage over the prior art to provide a stylus which does not require any sensing surface in order to be detectable. It would also be an advantage to therefore enable a stylus to be detectable as it moves within three dimensions.

Another aspect to be addressed is the ability to turn writing on and off. Typically, this type of function has required a sensitive surface, possibly a tether from the pen to another device, or an active pen. Accordingly, it would be an advantage over the prior art to provide a stylus that can be actuated to turn on and off writing-on an associated display, where the stylus is a passive device that does not write on a special sensing surface, and is not physically tethered to another device.

A final aspect of the invention is the ability to implement a stylus for use in a very small area. Consider the mobile telephone user that wants to input and email message and send it. It is a tedious and time consuming task with state of the art input options on cell phones. It would be an advantage over the prior art to provide a very small keyboard that is actuated by the stylus so that it can be used in mobile situations, and with relatively small devices.

SUMMARY OF INVENTION

It is an object of the present invention to provide a passive stylus that operates in two or three dimensions.

It is another object to provide a passive stylus that only requires a permanent magnet disposed therein.

It is another object to provide a passive stylus that can provide signals indicative of touchdown and pressure.

It is another object to provide a passive stylus that can provide "start" and "stop" writing signals to a display device, wherein the signals are actuated by normal writing movements and actions.

It is another object to provide a passive stylus that can include an inking cartridge that provides real inking of the stylus on paper when used off-screen.

It is another object to provide a passive stylus that can operate in three dimensions by providing a sufficient number of sensors to provide a three dimensional detection volume.

It is another object to provide a passive stylus that increases magnetic field strength to thereby function as an indicator of a changing signal.

It is another object to provide a passive stylus that rotates a permanent magnet stored within a pen body to thereby change polarity and provide a digital "on" and "off" signal.

It is another object to provide a passive stylus that can detect rotation of the stylus.

It is another object to provide a passive stylus that can be turned over to perform an erasing function on a display device.

It is another object to provide a passive stylus that can be incorporated into a mechanical pencil as well as with an inking cartridge.

It is another object to provide a passive stylus that can be utilized with a small keypad, wherein the keypad detects contact of the passive stylus with keys on the keypad.

It is another object to provide an active stylus that provides a signal to a display device to thereby provide pressure information so as to be able to draw with varying degrees of shading.

In a preferred embodiment, the present invention is a stylus that operates utilizing magnetic fields, wherein a permanent magnet is disposed within a passive stylus that is detectable by a plurality of magnetic sensors that subtract the magnetic field of the stylus from the earth's relative magnetic field to obtain vectors that are used in a triangulation equation to determine the location of the stylus within a writing area.

In a first aspect of the invention, each pair of magnetic sensors provides a vector, wherein two pairs provides vector information for two dimensions, and three pairs provide vector information for three dimensions.

In a second aspect of the invention, the three pairs of magnetic sensors are disposed in three of four corners in the plane of a virtual rectangle.

In a third aspect of the invention, one of the three pairs of magnetic sensors functions as a reference for earth's magnetic field.

In a fourth aspect of the invention, each of the magnetic sensors includes a polarizing coil to change direction of sensitivity, a null coil and a flipping coil.

In a fifth aspect of the invention, a "start" and "stop" signal generated by the passive stylus are detectable by the magnetic sensors by rapid movement of a permanent magnet within the stylus body.

These and other objects, features, advantages and alternative aspects of the present invention will become apparent to those skilled in the art from a consideration of the following detailed description taken in combination with the accompanying drawings.

DESCRIPTION OF THE DRAWINGS

FIG. 1 is a top elevational view of magnetic field sensors set out in sets to provide an area of sensitivity that is two dimensional when two sets are used, and three dimensional when three sets are used.

FIG. 2A is an example of an area of sensitivity of the present invention.

FIG. 2B is an example of another area of sensitivity of the present invention.

FIG. 2C is an example of another area of sensitivity of the present invention.

FIG. 24 a first circuit diagram that illustrates the layout of a sensor system that can be utilized in the present invention.

DETAILED DESCRIPTION

Figure 3:
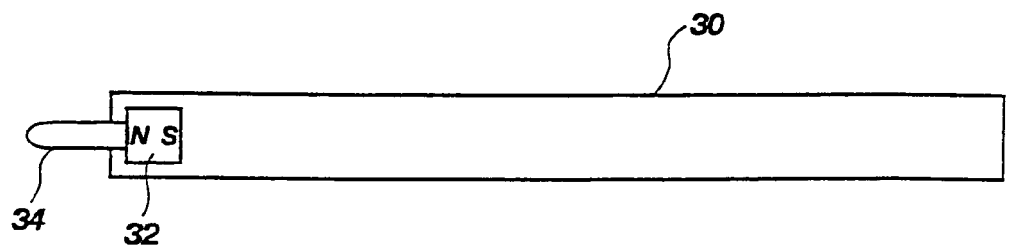
FIG. 3 is a profile cut-away view of a stylus.

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the invention is a plurality of magnetic sensors that are capable of determining a location and orientation of a passive stylus that generates a magnetic field without using a power source. In the presently preferred embodiment, the plurality of magnetic sensors are directionally sensitive devices. For example, the magnetic sensors can be a magnetic field sensor such as one sold having part number KMZ51 from Philips Semiconductors. However, any similar magnetic sensor can be substituted and create the same results. It is noted that the magnetic file sensor KMZ51 is relatively inexpensive, and is thus desirable for the applications herein.

In the presently preferred embodiment, the magnetic field sensors are disposed in pairs, stacked one on top of the other or arranged side-by-side, and separated by a non-conductive material such as PC board when they are stacked. Each pair of magnetic field sensors provides a vector to the stylus. Thus, two pairs of magnetic field sensors are sufficient to provide two vectors, and thus determine the location of the stylus in two dimensions.

In an alternative embodiment, a third magnetic field sensor is added to each pair, thus making two groups of three magnetic field sensors each. The third magnetic field sensor provides up-down sensitivity to give the configuration three-dimensional sensitivity.

It is noted that in the preferred embodiment, three magnetic field sensor sets will be arranged so as to have a straight line between them. For example, FIG. 1 shows a first magnetic sensor set 10, and a second magnetic sensor set 12, each set comprised of three magnetic field sensors 8. The directional sensitivity of each of the magnetic field sensors 8 is identified by the arrows 14. Note that the dot representing an arrow 14 in each set 10, 12 indicates that sensitivity is directed out of the page. The approximate area of sensitivity is identified by dotted line 16.

Unfortunately, a stylus cannot be detected when it is disposed along the straight line 18 that lies directly between the first and second magnetic sensor sets 10, 12. To be detectable, it is preferable in an alternative embodiment to include a third set 20 of magnetic field sensors. This third set 20 makes detection of a stylus in three dimensions much simpler, and also eliminates the "blind spot" represented by line 18.

It is noted that in the alternative embodiment of three sets 10, 12, 20 of three magnetic field sensors each, the sets are preferably arranged as three corners of a square or rectangle. This area is represented by area 16.

It is important to recognize that the area of sensitivity can be varied according to the desired placement of the magnetic field sensor sets. This means that the area of sensitivity is a relative area that is based upon the needs of the application. For example, if the application is for a cursor control input device, then the area of sensitivity 22 could be as shown in FIG. 2A relative to three magnetic field sensor sets 24, or as in FIG. 2B or 2C. What is important to realize is that the area of sensitivity is very approximate, and will extend beyond the sharply defined lines of the figures. However, it is the practical realization that some arbitrarily defined area must be selected to give a user a feel for the area to operate in to write, draw, or cause cursor movement in a defined area on a computer screen when that is the application of a stylus and sensors.

FIG. 3 illustrates that the presently preferred stylus 30 is a generally pen-like object, having a permanent magnet 32 disposed near the tip 34 thereof. The stylus 30 preferably has a magnetic field whose strength is approximately equal to that of the earth's magnetic field.

In order to understand operation of the stylus 30, it must be considered in context with an understanding of the operation of the magnetic field sensors. Each magnetic field sensor of the preferred embodiment includes a polarizing coil. The polarizing coil allows a user to swap the direction in which a magnetic field sensor is sensitive. This feature enables a user to cancel out offsets, drift, etc. Generally, a user will only swap directions in order to occasionally "zero-out" the magnetic field sensor, but will generally not perform this operation before every measurement. The magnetic field sensors generally have good bandwidth, from about 1 volt DC to about 1 MHZ.

Figure 4:
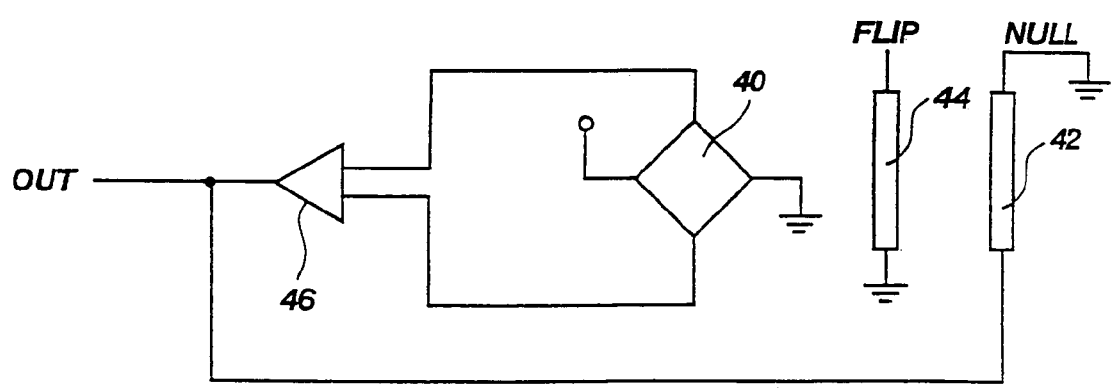
FIG. 4 is circuit diagram of a magnetic field sensor.

As shown in FIG. 4, the magnetic field sensor is essentially a bridge 40, which also includes a nulling coil 42 and a flipping coil 44. In order to get a good dynamic range, it is best to avoid flipping before each measurement because as the magnetic field grows higher and higher, it starts saturating the magnetic field sensor. At that point, the magnetic field sensor begins to lose linearity.

Accordingly, the preferred magnetic field sensor includes the nulling coil 42. The output of a differential amplifier 46 is fed back into the nulling coil 42. This allows obtaining a "zero" magnetic field on the magnetic field sensor, to thereby increase gain immensely while maintaining linearity.

It is important to realize that if the sensor system is to be accurate, the sensor system should not try to maintain a linear circuit. Instead, the user should select a null point, and then feed a linear DAC into it to maintain a null point. That provides the sensor system with a tremendous dynamic range. By using the nulling coil 42, it is possible to maintain linearity and better range.

It is also noted that the range of the magnetic field sensor is a function of several factors. An analog-to-digital (A/D) converter used in the presently preferred embodiment is 14 bits. This A/D convertor is sufficient to obtain an area of sensitivity that is approximately 8.5 by 11 inches, or a regular sheet of paper. This area of sensitivity is obtained when the sets of magnetic fields sensors are separated by approximately 4 or 5 inches. Using a 16 bit A/D converter would obtain an even greater range, and thus provide a larger area of sensitivity.

Assume that a sensor system is operated in the configuration as shown in FIG. 1, with three sets 10, 12, 20 of three magnetic field sensors. When the sensor system is first turned on, the system will be assumed to be stationary and coupled to a desktop computer or other stationary device. The first action is to calibrate the sensor system so that it can determine its position relative to the earth's magnetic field. This information is preferably stored in a driver, RAM or other memory device. This information is used for sensitivity and correction factors. Each magnetic field sensor set 10, 12, 20 provides a vector to a stylus that is disposed within the identified area of sensitivity 16. It is important to determine an absolute vector, then subtract out a calibration vector.

If all of the magnetic field sensor sets 10, 12, 20 give vectors that are parallel to each other, then it is assumed that there is no magnet within the area of sensitivity 16. Because the earth's magnetic field is also known, that is also subtracted out to thereby obtain a null space within the sensor system's field of sensitivity.

When the stylus is introduced into the null space (field of sensitivity), the threshold for the presence of the stylus is simply a determination that the vectors are no longer parallel. By subtracting out the magnetic field of the permanent magnet disposed within the stylus from the earth's relative magnetic field, the user obtains two vectors that point to the stylus. By triangulation, the location of the stylus is then determined.

Figure 5:
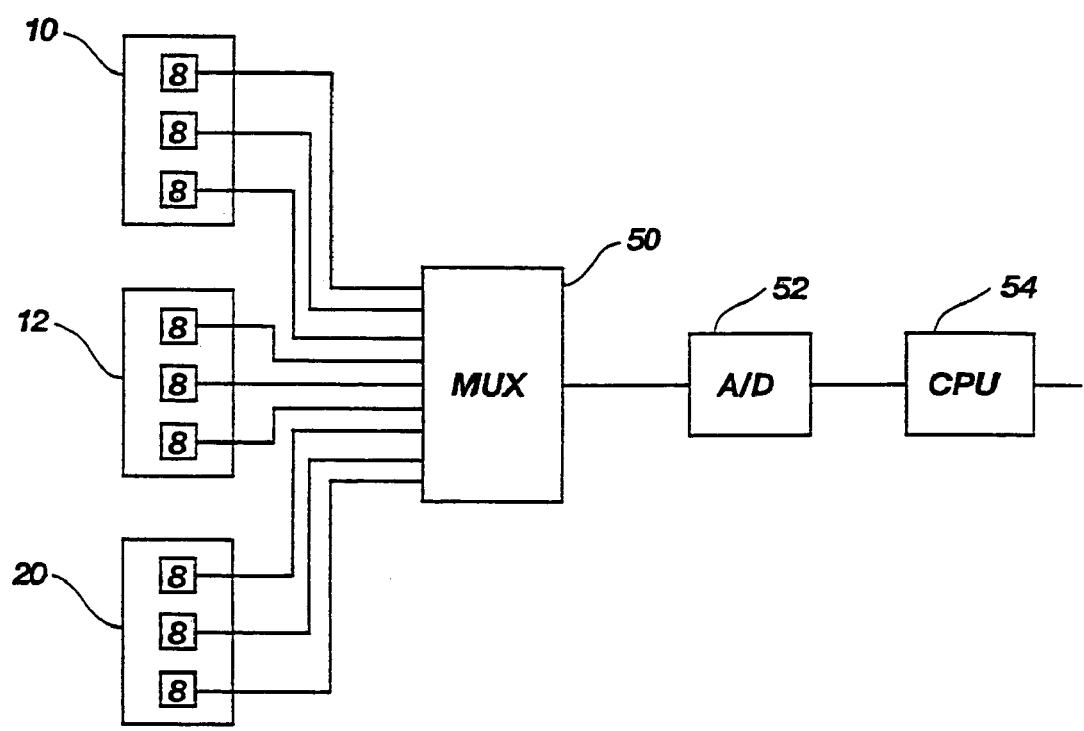
FIG. 5 is schematic diagram of components of the present invention.

FIG. 5 is a schematic diagram of the presently preferred sensor system. As shown, a MUX 50 goes to all the magnetic field sensors 8 of the three magnetic field sensor sets 10, 12, 20. The signal from the MUX 50 goes to an A/D converter 52, which is then passed to a CPU 54. The presently preferred embodiment utilizes an A/D converter card disposed in a slot of a personal computer. The input to the A/D converter 52 is accessed by a program executing on the personal computer to process a triangulation formula to thereby provide stylus position determination. A good example of an A/D converter with adequate properties is an 8051 processor.

Some details on triangulation methods are useful to an understanding of implementing the present invention. Triangulation is usually done in one of two ways, neither of which is adequate for the present invention. The first method will not work because when either an x or y sensor has a value close to zero, it becomes for difficult to determine accurate coordinates. Furthermore, if the user is inclining the stylus, incorrect coordinates are again given.

The second method requires an alternating signal from the source of a fixed frequency and uses two sensors at a fixed distance from each other. This method is not useful for tracking the stylus of the present invention because the magnetic sensors look at non-alternating magnetic fields and frequency information is not available.

Thus, the present invention looks to the circular-triangulation method. This method uses a knowledge of how magnetic fields drop off in distance. As a magnetic source moves away from it's sensor, the sensor records a value that is proportional to the inverse cube of the distance between the source and sensor. This information-enables a hypothetical circle to be drawn around the sensor at a radius that is calculated from the sensor value and the inverse-cube formula. This circle projects all the possible points the stylus can be on.

A second sensor at a fixed distance away projects another circle of a different radius. The circles intersect in at most two points, with one of the points being behind the sensors in a non-drawing area, which means that this point can be eliminated as a solution. The remaining point's coordinates are thus calculated by solving for the intersection of the two circles and using the positive solution as the coordinates of the stylus.

This method has the advantage of only requiring two x or two y sensors separated at a distance, as opposed to the four sensors required for the angle methods described above.

Advantageously, changes in the pen's angle with respect to the writing surface do not influence the calculation of the stylus' coordinates if two x and y sensors are used at each sensing location. A decrease in x from one set of sensors will be compensated for by an increase in the corresponding y from that set. The magnitude between the two sensors can be determined as the square root of $(x^2+y^2)$. This eliminates angle disturbances because of low x and y values, and eliminates the effects of pen angle with respect to a writing surface.

This method also allows for increased distance because of the use of raw sensor magnitudes instead of angles calculated from these magnitudes. The same concept can be applied to electromagnetic fields, which lose energy in their fields by the inverse of the distance-squared, as opposed to inverse of distance-cubed for magnetic dipoles. Spheres can be drawn from each antenna to the source and the solution of the source's coordinates is found be solving for the intersection of the spheres. By triangulating electromagnetic sources with this method, dependence on the angle that the object is facing with respect to the antennas of the magnetic sensors can be eliminated.

The stylus 30 used with the presently preferred and alternative embodiments has been described as a passive device with a permanent magnet 32 disposed therein. However, the present invention also teaches alternative designs for the stylus that include modifications to the passive configuration, and the addition of active elements that enable the user to do more than just determine the location thereof.

For example, to enhance the passive stylus, it can be advantageous to alter the strength of the magnetic field generated by the stylus. If this change in strength can be detected, the stylus is able to provide more input information to a receiving device. An embodiment that provides a changing magnetic field relies on applying pressure to a stylus tip.

Figure 6:
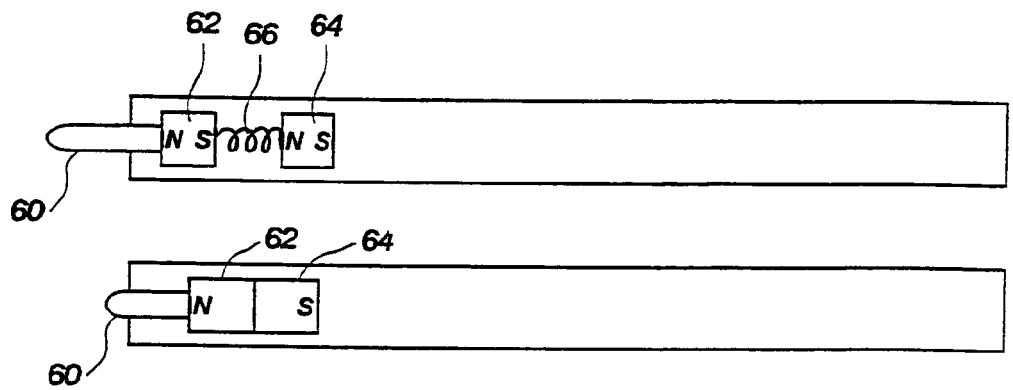
FIG. 6 is a profile cut-away view of two views of a stylus showing an alternative embodiment.

In FIG. 6, the increased pressure pushes a stylus tip 60 inwards until the first permanent magnet 62 makes contacts with a second permanent magnet 64. The magnetic field of the combined permanent magnets 62, 64 is larger than the individual magnets, and this increase in magnetic field strength is detectable. Releasing pressure on the stylus tip 60 enables a spring 66 to push the permanent magnets 62, 64 apart, returning the magnetic field strength to an initial state. This is all done without the use of a power source.

Figure 7:
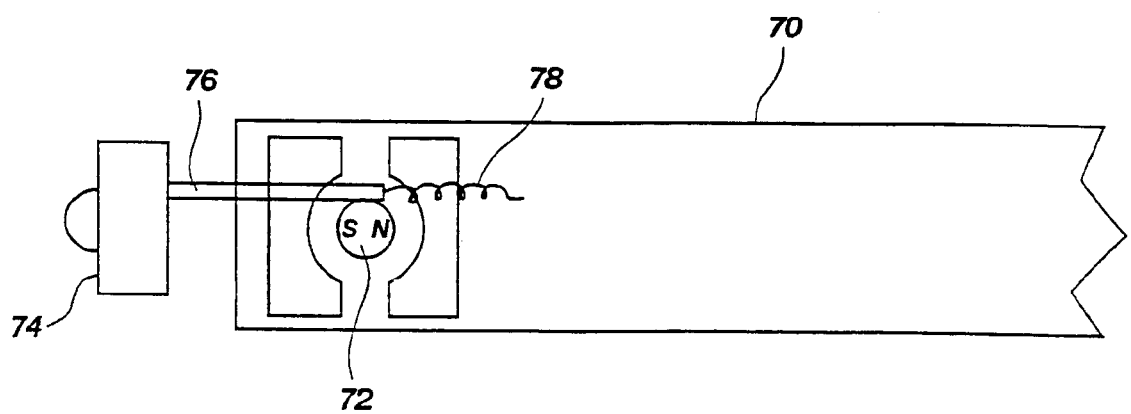
FIG. 7 is a profile cut-away view of an alternative embodiment of a stylus.

In an alternative embodiment, it is possible to introduce active elements that go beyond the basic stylus design above. For example, FIG. 7 is an alternative embodiment of an active stylus 70. In this embodiment, the inner detail of the stylus 70 is illustrated to show that a permanent magnet 72 is oriented in a first orientation when at rest. Shown here, the south pole of the magnet is toward the stylus tip. When pressure is applied to the stylus tip 74, a rod 76 pushes on the permanent magnet 72, causing it to rotate. The rotation reverses the polarity of the permanent magnet 72, causing the south pole to be on the opposite side, away from the stylus tip 74. Thus, the stylus again provides a signal to an input device. The signal could be a digital 1 changing to a digital 0, or vice versa. The spring 78 pushes the rod 76 back towards the stylus tip 74 and thus causes the permanent magnet to rotate back to an original orientation when pressure is removed from the stylus tip.

Generally, a stylus does not need to provide "Z" to an input device. However, "Z" orientation is useful when using an electronic paintbrush because it provides an infinite range of pressure values.

Figure 8:
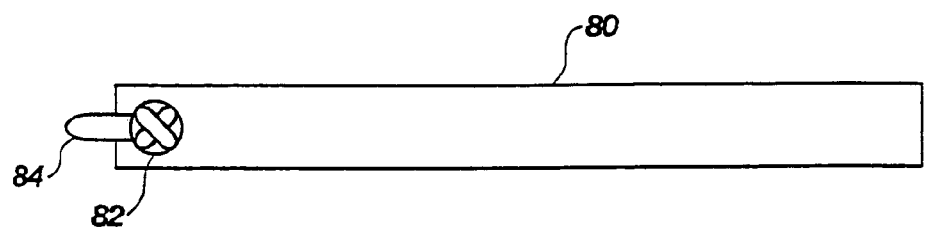
FIG. 8 is a profile cut-away view of an alternative embodiment of a stylus.
Figure 9:
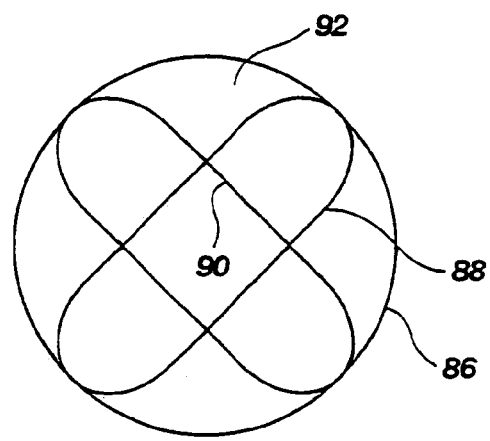
FIG. 9 is a close-up view of the drive coils of FIG. 9.

The next alternative embodiment of an active stylus is shown in FIG. 8. The stylus 80 is shown having a coil configuration 82 near the tip 84 of the stylus. The coil configuration 82 comprises three coils 86, 88, 90 disposed about a sphere 92 as shown in close-up in FIG. 9. The coils 86, 88, 90 are drive coils having three different frequencies, from 250 KHz to 1 MHZ. Each of the magnetic field sensor sets would be tuned to be sensitive to a different drive coil. In this way, the sensor system would not only be able to track the location of each drive coil in three dimensions, but it would also enable the detection of rotation. The only drawback to this embodiment is that the drive coils would require power to drive them at the required frequencies. However, the tradeoff is obtaining not only XYZ position, but pitch, roll, and yaw. Thus, the sensor system would have six (6) degrees of freedom. It is noted that it would be possible to transmit the signals from each coil 86, 88, 90 to another device, such as a personal digital assistant (PDA), because each coil functions as an antenna of its own signal, thus providing a wireless connection.

Accordingly, the present invention enables the use of static magnetic fields instead of dynamic fields. This fact provides a way to use permanent magnets that do not require power when using the basic features of the invention, and only requires power when trying to do provide more features to the user.

Figure 10:
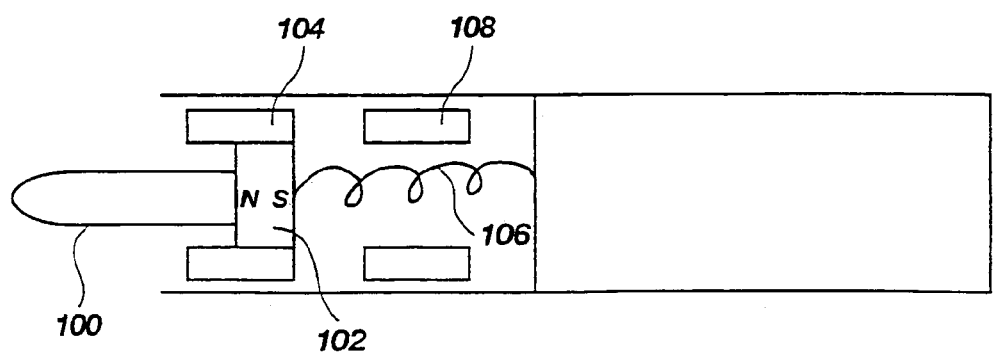
FIG. 10 is a profile cut-away view of an alternative embodiment of a stylus.

FIG. 10 is provided as an illustration of another means for increasing magnetic field strength. The stylus tip 100 is coupled to a permanent magnet 102 and to a cylindrical coil 104 (shown in cross-section). When the spring 106 is compressed by the tip 100 until making contact with another cylindrical coil 108, the magnetic field strength is increased.

Figures 11, 12:
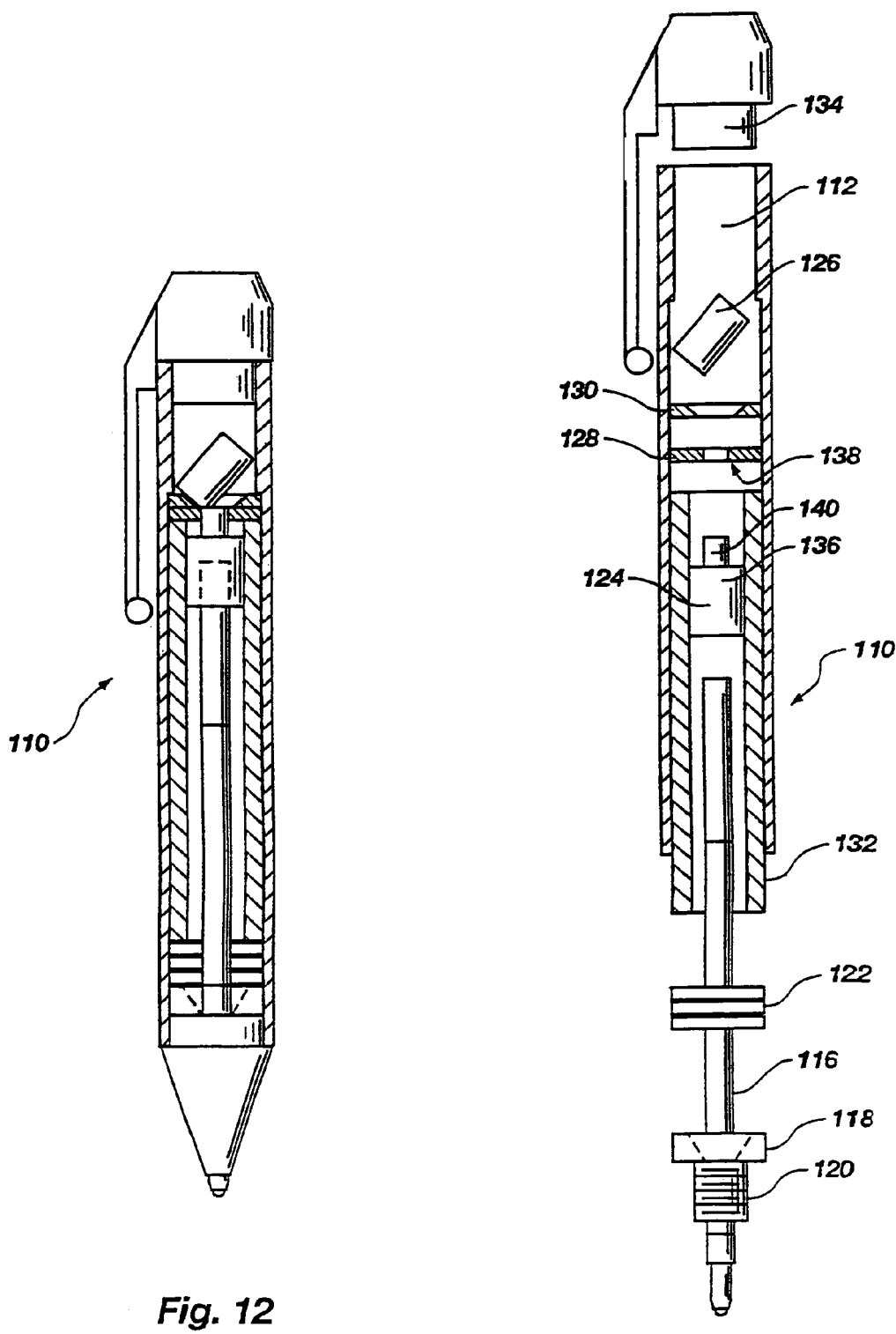
FIG. 11 is a cross-sectional profile view of another embodiment of a passive stylus.
FIG. 12 is a cross-sectional profile view of the passive stylus of FIG. 11.

FIG. 11 is a cross-sectional profile view of an alternative embodiment of a passive stylus 110 in an exploded view. This passive stylus 110 provides "start" and "stop" signals to the magnetic sensors through a novel use of a tilting magnet. The components of the passive stylus 110 are a plastic housing 112 or other material that will not interfere with magnetic fields. The housing 112 has a plastic or ferrous housing cap 114 that can be removed in order to replace an ink cartridge 116. The ink cartridge 116 includes an interference fit threaded ferrous component 118 with the housing 112. The threaded ferrous component 118 is threaded in order to couple the plastic housing cap 114 to the plastic housing 112. A spring 120 is disposed between the interference fit threaded ferrous component 118 and the inside of the plastic housing cap 114. Above the interference fit 118 are disposed circular ceramic magnets 122 that have a hole through the middle for the ink cartridge 116 to pass through. The number of ceramic magnets 122 depends upon the sensitivity of the magnet sensors that are being used to detect the location of the ceramic magnets. More or stronger magnets will improve detection of the passive stylus 110.

On the top of the ink cartridge 116 is disposed a plastic actuator 124. This plastic actuator is used to more uniformly push on the rare earth magnet 126. Whereas the top of the ink cartridge might be dented or otherwise made irregular, the plastic actuator 124 presents a consistent interface to the magnet 126. Between the plastic actuator 124 and the rare earth magnet 126 are disposed a ceramic trigger magnet 128, and a ferrous washer 130 with pitched ID. The last two components are a ferrous cylinder 132 that extends along most of the length of the plastic housing 112, and a plastic housing cap 134 that is screwed into the plastic housing 112.

FIG. 12 is a cross-sectional profile view of the passive stylus 110 shown in FIG. 11, but put together in an operable mode.

Operation of the passive stylus 110 is novel in its system for enabling the magnetic sensors to determine when a user wants to begin writing on a display, and to stop writing. A user will begin to write with the passive stylus 110. After gentle and nominal pressure is applied, as when a person presses down on paper to write with ink, the passive stylus 110 actuates the "start" signal, indicating that an associated display device is to begin "inking" or writing on a display.

This "start" signal is generated by the pressure on the ink cartridge 116. This pressure causes the ink cartridge 116 to move approximately 1/16 to 1/8 of an inch upwards into the plastic housing 112. The ink cartridge 116 is coupled to the plastic actuator 124, which is turn moves through a whole in the ceramic trigger magnet 128, and then partially into the pitched ID of the ferrous washer 130. Movement of the ink cartridge 116 is stopped because of the plastic actuator 124 that cannot move past the ceramic trigger magnet 128 when a lower shelf 136 meets the bottom 138 of the ceramic trigger magnet.

Figure 13:
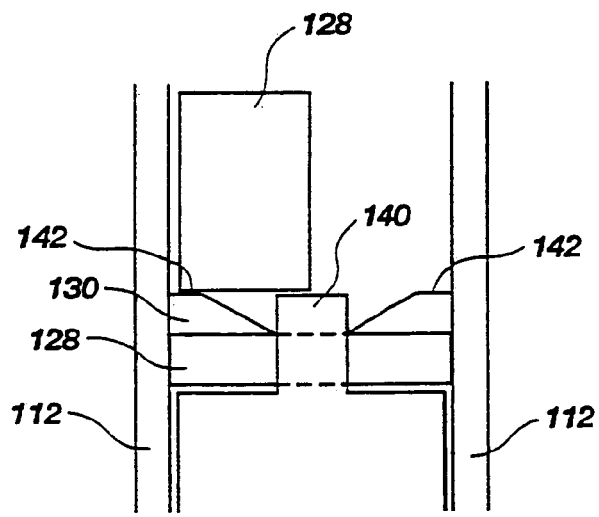
FIG. 13 is a close-up cross-sectional view of the passive stylus of FIG. 11, with the stylus actuated to write on a display.

FIG. 13 is provided as a close-up view of how the above-described process will appear when the user is writing. The figure shows the plastic housing 112, the rare earth magnet 126 that is now in an upright position, the ferrous washer 130 with the pitched ID, the ceramic trigger magnet 128, and the plastic actuator 124. A tip 140 of the plastic actuator 126 is pushing up on a bottom surface of the magnet 126. The magnet 126 is now resting on a small lip 142 of the ferrous washer 130.

It may not be obvious why tipping the rare earth magnet 126 from an inclined position to an upright position will provide a "start" signal. However, the magnetic sensors that are tracking the position of the passive stylus 110 are also detecting the rare earth magnet 126. When the rare earth magnet 126 is at rest in the inclined position shown in FIGS. 11 and 12, the magnet 126 is actually being held in place by magnetic attraction to the ferrous washer 130. The force required to break the rare earth magnet 126 free is relatively small, approximately 80 to 100 grams of force. However, when the rare earth magnet 126 breaks free, it accelerates rapidly and moves to the upright position to which it is also magnetically attracted on the lip 142 of the ferrous washer 130. Even though the distance moved by the rare earth magnet 126 is very small, it is very detectable. Fortunately, the movement is also very rapid, which is the key to distinguishing this movement from ordinary movement of the passive stylus 110 when writing. This movement is so fast that it will not be accidentally caused through normal use of the stylus.

Likewise, the release of pressure off the ink cartridge 116 will enable the stronger attraction of the rare earth magnet 126 to be in the inclined position to occur. The amount of force is approximately 45 to 50 grams, but can be varied as desired, as can the actuation force. The rare earth magnet is trying to be in the inclined position because the lip 142 is small as compared to the broader surface of the pitched ID of the ferrous washer 130.

The movement of the ink cartridge 116 that is necessary to send the start and stop signals is barely detectable, enabling the passive stylus 110 to function well as a normal inking pen. The movement of the rare earth magnet as it snaps into an actuated upright position, and then snaps back to the released inclined position does not interfere with use of the stylus. Furthermore, various methods of dampening any outward indication of this motion is possible by modifying the plastic housing 112.

Another aspect of the present invention is to provide pressure sensing utilizing an active stylus. Varying degrees of pressure applied to the stylus tip are difficult to detect with the magnetic sensors. Accordingly, a resistive rubber is used to detect pressure. The rubber changes resistance for small changes in compression. The force of the stylus' ink cartridge on a writing surface is used to compress the rubber against the case of the stylus. This change in resistance is used to change the frequency of an RC oscillator. This information is then sent to a frequency modulated transmitter. The data is transmitted to a receiver on a controller board. A microcontroller on the controller board determines the frequency of the signal, or the change from a given frequency, to thereby determine the degree of pressure that is being applied to the stylus tip on a writing surface. Ultimately, the pressure data can be displayed in two different ways. Either the width of line being drawn can be varied, or an inking gray scale is displayed on a computer display.

Figure 14:
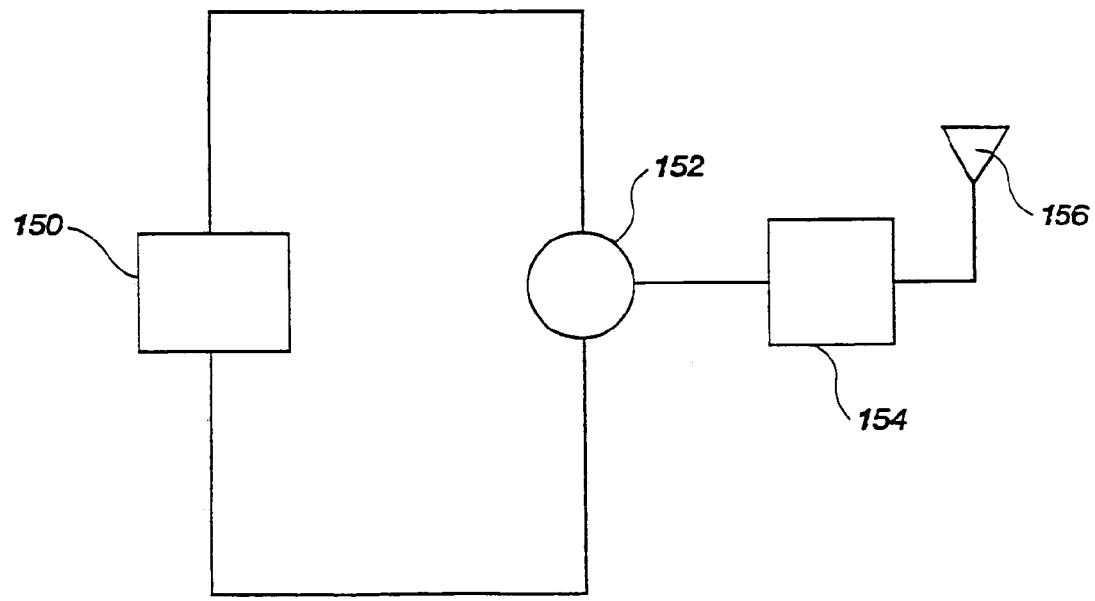
FIG. 14 is a block circuit diagram that can be used to determine the degree of pressure being applied by a stylus tip on a writing surface.

The resistive rubber acting as a pressure transducer for the present invention is operating in the circuit described in FIG. 14. FIG. 14 shows the resistive rubber 150 coupled to an RC circuit 152. For example, a 555 chip can receive inputs from the resistive rubber 150. Output from the RC circuit 152 is sent to an RF modulator 154 for transmission via antenna 156. Output from the RF modulator 154 is utilized to determine the degree of compression of the resistive rubber 150, and thus the degree to which pressure is being applied. A conversion table can be used to relate the amount of pressure being applied to a value for the width of a line being drawn, or the shade of gray that should be applied.

A resistive rubber that can be used in the present invention is sold under the brand name of ZOFLEX ZF40™.

Figure 15:
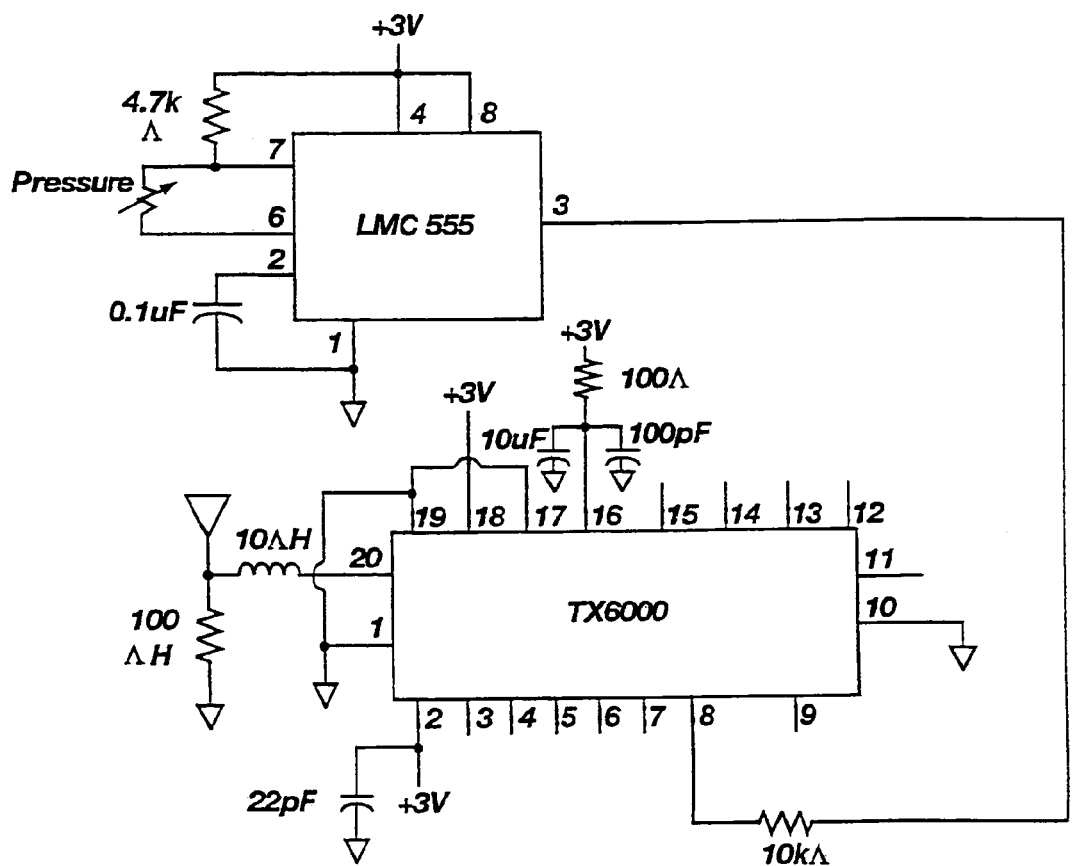
FIG. 15 is a circuit diagram of a transmitter utilized in an active stylus that is performing pressure sensing described in FIG. 14.

FIG. 15 is provided as an example of a circuit that can be utilized to transmit the pressure data from the stylus to the controller board. This is a sample only, and should not be considered limiting. However, it is noted that this type of transmitter can be disposed within the space limitations of a stylus.

It is noted that the present invention has many applications, especially with mobile appliances such as cell phones, digital phones, PDA's and other similar electronic appliances that need simple yet efficient ways of inputting data to an electronic device.

Another aspect of the invention is the ability to detect very small and precise positioning of the passive stylus. This enables the passive stylus to be used in a very small area that is defined as a keyboard. The keys of the keyboard are actuated by the small tip of the passive stylus. For example, consider a small keyboard that is coupled to a mobile telephone. The keyboard contains the magnetic sensors of the present invention, and can determine what key is being touched by a tip of the passive stylus. This detection ability can enable rapid input of text to a mobile phone, for example, to send email messages.

By providing the keyboard with its own memory, the keyboard could also be provided with a small display screen, such as one line of text on an LCD display. The keyboard could then even be used when not attached to the mobile telephone, for example, to take notes during a call. Afterward when the keyboard is attached to the mobile telephone, the memory of the keyboard is uploaded or synchronized with the memory in the mobile telephone, so that a user can input data that has been stored by the keyboard. For example, a user can take notes on the keyboard while talking on the mobile telephone. After the conversation is over, the user attaches the keyboard to the mobile telephone, and uploads whatever data was typed into the keyboard memory into the memory of the mobile telephone. Typically, this action is performed in order to send the data in an email message from the mobile telephone.

However, the keyboard does not have to be used apart from the mobile telephone. The keyboard can be used when attached to the mobile telephone. The user may be able to take advantage of the larger display of the mobile telephone, or just continue to use the built-in LCD display of the keyboard. This may depend on the visibility of the LCD display when the keyboard is attached to the mobile telephone.

Figure 16:
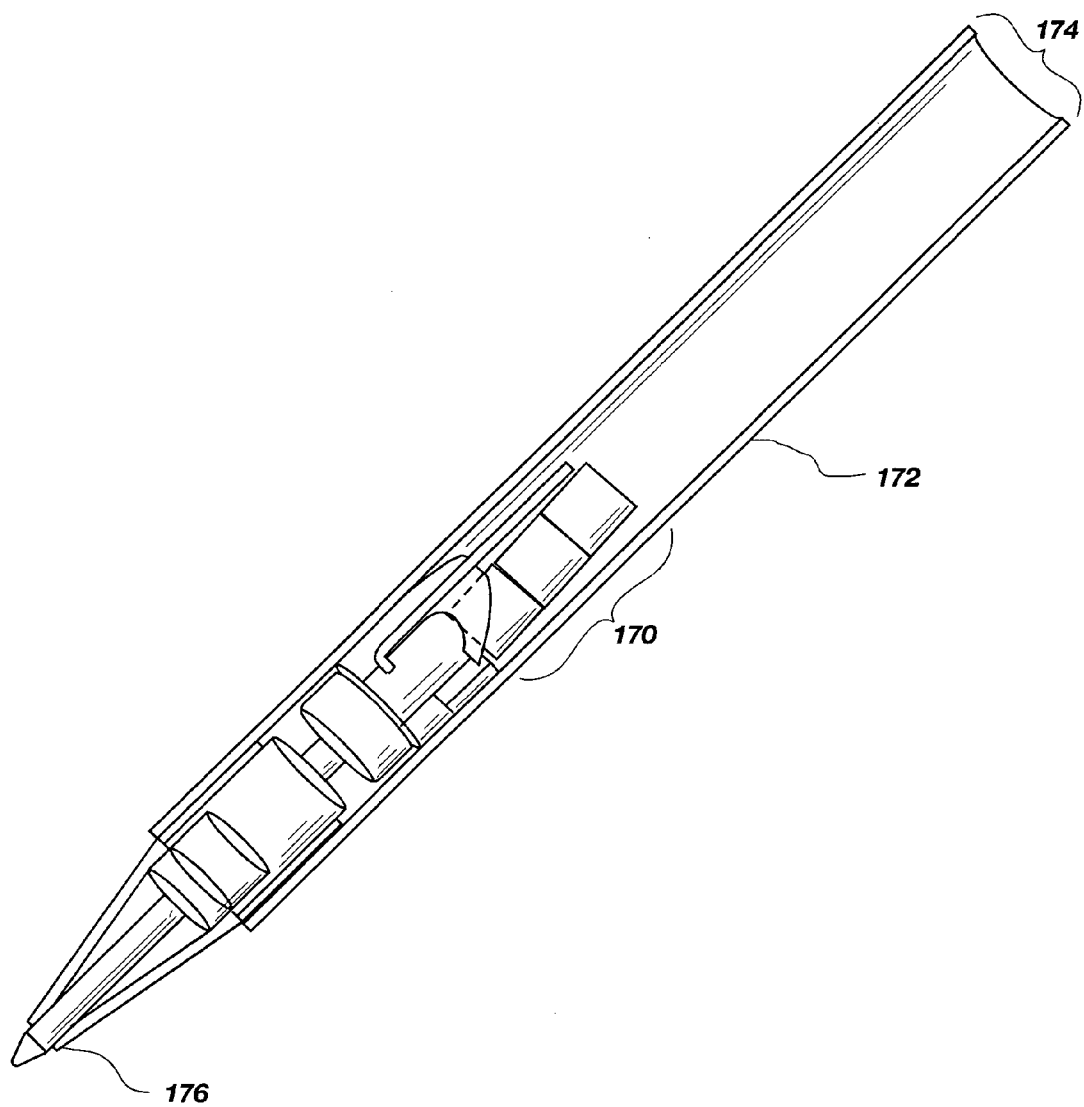
FIG. 16 is a see-through view of the components in an improve tilt stack pen embodiment.

Two additional stylus embodiments have been developed which are an improvement over the previous embodiments. The first new stylus embodiment has much in common with the earlier designs. Before describing the embodiment shown in FIG. 16, it is useful to understand that the algorithms being used in a two sensor system work best when there is a single magnetic dipole being seen in the stylus. But a single magnet creates weaker magnetic field lines. Thus, a balance has been reached, where a small stack of magnets 170 is used. The stack of magnets 170 is large enough so that their signal can be tracked over a larger area, but small enough that the critical tilting of the stack of magnets 170 is still detectable within the stylus.

Another factor in the design is the diameter of the stylus body 172. If the stylus body 172 has a large diameter, the stack of magnets 170 can tilt further within the stylus, which is more detectable by the sensor system. But a large stylus diameter 174 is not desired because it can become too large to feel comfortable in the average user's hand. Accordingly, the stylus diameter 174 must be balanced against the height of the stack of magnets 170, which must be balanced against the need for a detectable tilt of the stack of magnets when changing from a non-inking mode, to an inking mode, and back again. Furthermore, the stack of magnets 170 has been moved as close as possible to the inking end 176 of the stylus 172. This is helpful to the sensor system.

The next embodiment is a substantial departure from the tilting stack of magnets shown in the previous embodiment. In this new embodiment shown in a top view in FIG. 17A, three magnets 200, 202, 204 are separated some distance that allows them to rotate without touching each other, but to still be close enough to have a strong magnetic attraction. The magnets 200, 202, 204 are disks having the same height and diameter. Height and diameter can be varied, even within the same pen if the mechanical structure within the stylus compensates. To operate properly, they are also aligned coaxially along common axis 206. Coaxial alignment is critical for the algorithms currently in use because the magnets will appear as a single magnetic dipole.

This new embodiment operates on the principle of using magnetic attraction between magnets to enable the on/off inking and non-inking signal from a stylus. Consider three magnets which are coaxially aligned, but are spaced apart. Three magnets are used to increase the strength of the magnetic field lines of the stylus. However, two magnets could be used, as well as more than three. The magnets 200, 202, 204 are free to rotate along parallel axes 208, 210, 212.

Figure 17A:
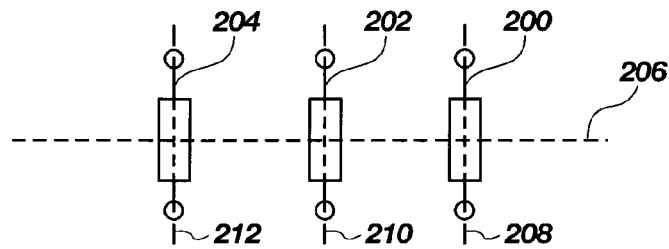
FIG. 17A is a top view of three round magnets.
Figure 17B:
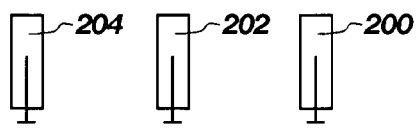
FIG. 17B is a profile view of the magnets in FIG. 16A.

FIG. 17B is a profile view of the same set of magnets as shown in FIG. 17A, but the profile view is necessary to see the rotation of the magnets.

Figure 17C:
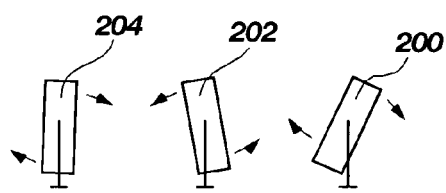
FIG. 17C is a profile view of the magnets being rotated.

FIG. 17C is a profile view of the magnets 200, 202, 204, where the first magnet 200 is beginning to be rotated. If rotated slowly, it is easy to see that the second magnet 202 begins to rotate in a somewhat delayed fashion because of the inescapable effects of friction between a magnet casing or holder, and the physical pins being used as the axis along which the magnet is turning. The third magnet 204 rotates in a more pronounced delayed manner.

Figure 17D:
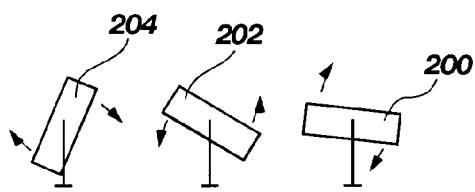
FIG. 17D is a profile view of the magnets being rotated.
Figure 17E:
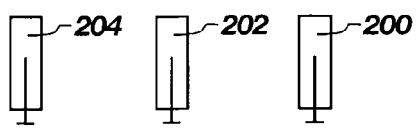
FIG. 17E is a profile view of the magnets having completed a rotation of 180 degrees.

FIG. 17D shows that when the first magnet 200 is turned (rotated about an axis) some amount greater than 90 degrees, the first magnet 200 will then rapidly continue the movement, if unimpeded, until it has turned a full 180 degrees because of the attraction to the second magnet 202 which is also being caused to turn. Thus, by turning the first magnet 200, the second magnet 202 also turns in order to maintain attraction between the North and South poles of the magnets 200, 202. The third magnet 204 will likewise be caused to turn because of the rotation of the second magnet 202. If the first magnet 200 is turned very rapidly, the second and third magnets 202, 204 also turn very quickly so as to be virtually simultaneous. Slowly turning the first magnet 200 results in a delay down the line of magnets. Yet, once the first magnet 200 is turned beyond 90 degrees, it rapidly snaps over if movement is unimpeded, along with the second and third magnets 202, 204. FIG. 17E shows that the magnets 200, 202, 204 have completed rotation 180 degrees, and form a single magnetic dipole.

This embodiment requires all of the magnets to operate about parallel axes 206, 208, 210. The space between the magnets must be large enough to allow free rotation, and small enough to enable strong attraction between the magnets that results in the rapid "snapping" rotation. It is this rapid rotation that is recognized by the magnetic sensors as a signal for a change of state between inking and non-inking. It is also an advantage that the magnets are changing polarity by 180 degrees. The change in magnetic field lines is more recognizable to the sensors than the change in the field lines from a stack of tilting magnets.

The reason for trying to make the motion of the magnets rapid is because it desirable to have a signal that is recognizable to the sensor system and virtually instantaneous so that the on/off inking action of the stylus can occur without any visible delays. This is one of the advantages of using an active instead of a passive stylus. The active stylus can transmit a signal, such as an RF signal, that travels virtual instantaneously to a sensor system, and inking can be turned on an off rapidly. But a passive stylus must try to make its inking signal as rapid as possible without using power from an electrical source. Of course, the passive stylus does not need to have a battery replaced.

Figure 18:
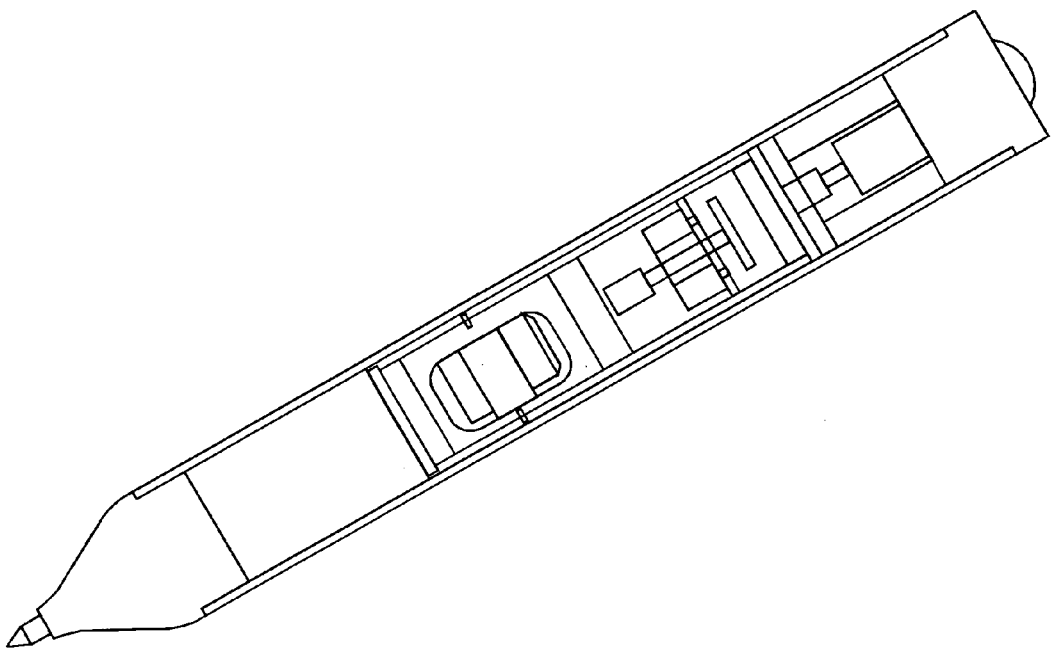
FIG. 18 is a see-through perspective view of an assembled stylus using the magnets of FIG. 17.

FIG. 18 is a see-through profile view of the assembled components of this stylus embodiment to be described hereinafter.

Figure 19:
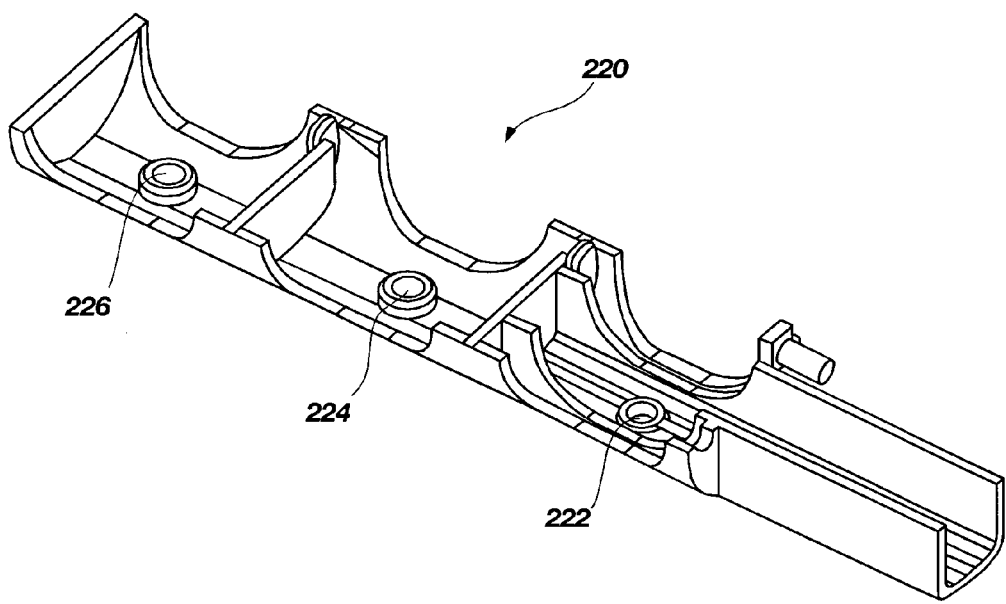
FIG. 19 is a perspective view of half of the housing for the three magnets.

FIG. 19 is a perspective view of one half of the housing 220 for the magnets within a stylus body. The view illustrates the holes 222, 224, 226 for the axis pins of the magnets 200, 202, 204. The other half of the housing would have the other corresponding holes for the other axis pins.

Figure 20:
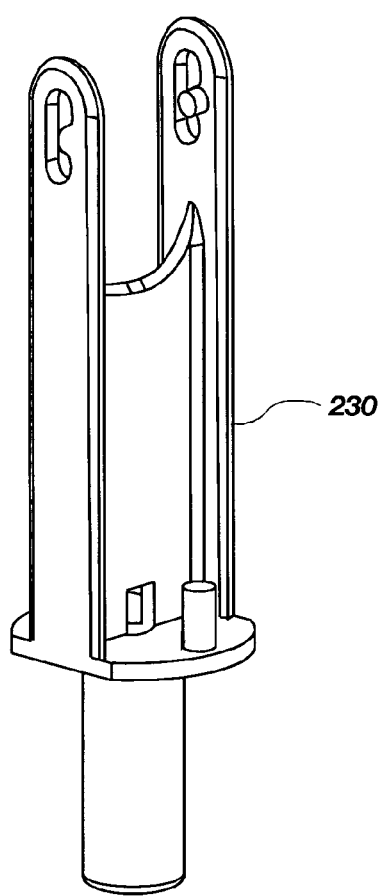
FIG. 20 is a perspective view of a lever arm that is pushed by the pen tip, causing the first magnet to rotate.
Figure 21:
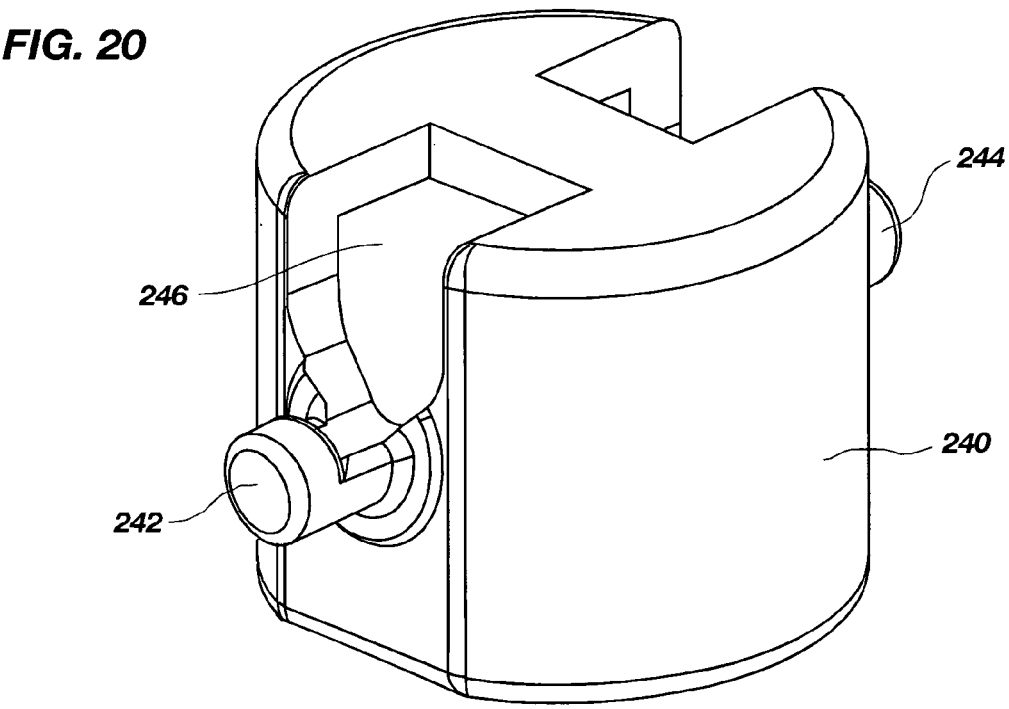
FIG. 21 is a perspective view of a holder for the first magnet.
Figure 22:
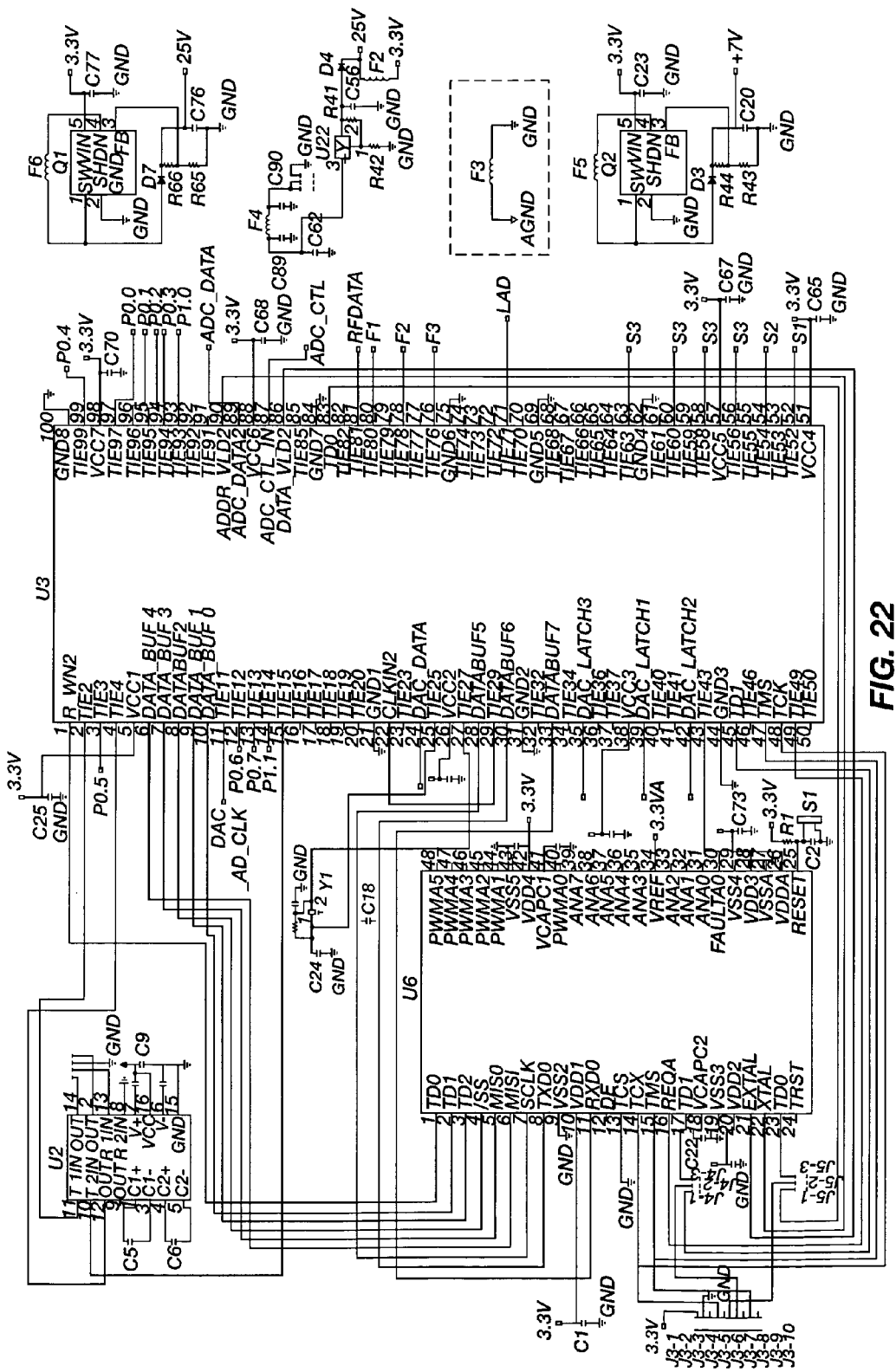
FIG. 22 a first circuit diagram that illustrates the layout of a sensor system that can be utilized in the present invention.
Figure 23:
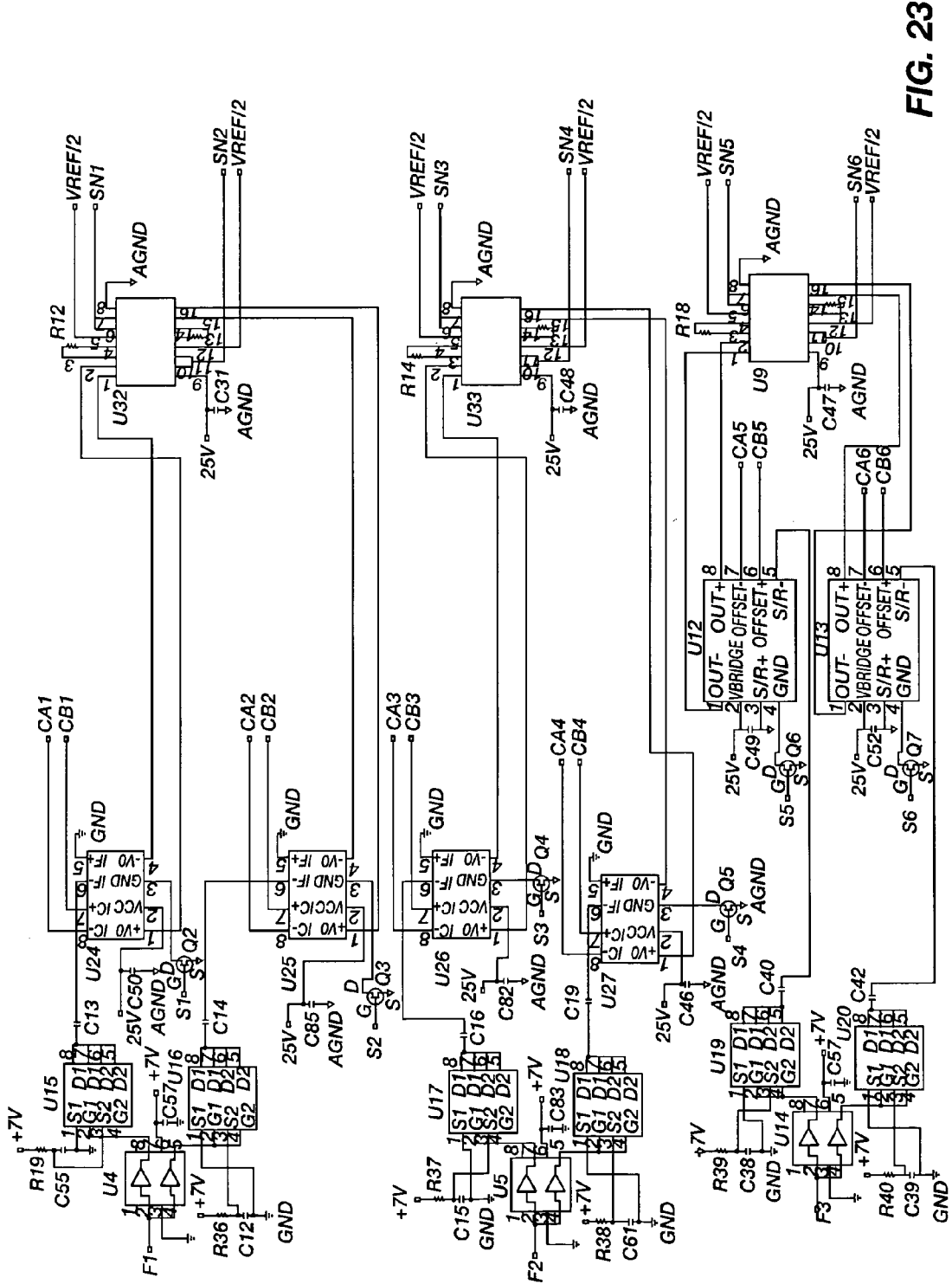
FIG. 23 a first circuit diagram that illustrates the layout of a sensor system that can be utilized in the present invention.
Figure 25:
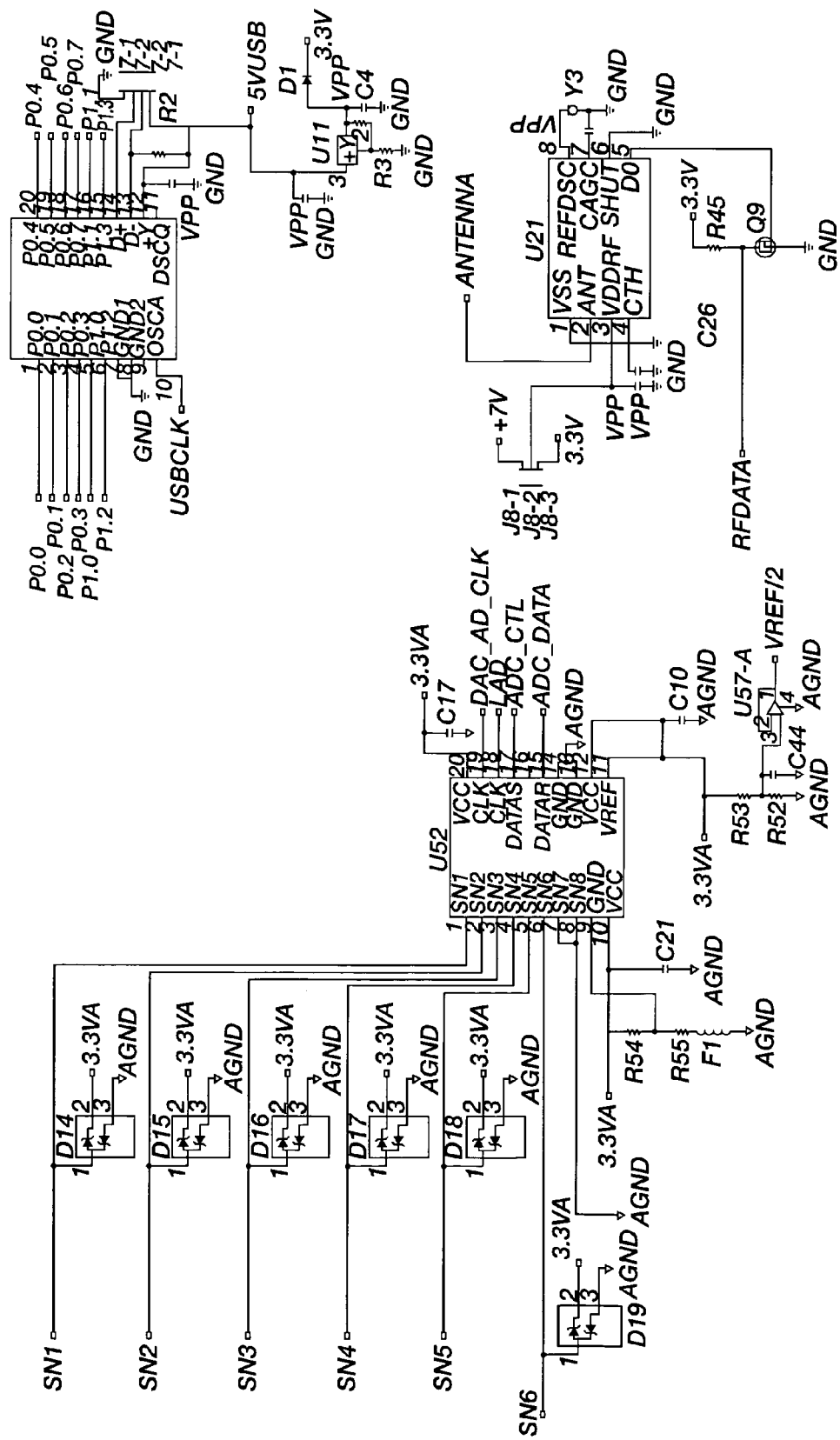
FIG. 25 a first circuit diagram that illustrates the layout of a sensor system that can be utilized in the present invention.

A mechanism must be in place to push on the first magnet 200 so that it is caused to rotate. In this embodiment, pushing down on a stylus tip (not shown) will cause a lever arm to push against a magnet casing (FIG. 21). FIG. 20 shows the lever arm 230 that is pushed upward in the stylus to cause the casing of the first magnet 200 to rotate. In order for the first magnet 200 to rotate back 180 degrees when the user is no longer pushing on the stylus tip and therefore does not want to ink, the lever arm 230 compresses a spring (not shown) within the stylus body. When the user removes the stylus tip from a writing surface, the spring pushes the lever arm down toward the stylus tip, which pulls the casing of the first magnet 200 and causes the first magnet to rotate. Back to its original position.

FIG. 21 is a perspective view of a magnet casing 240 in which the first magnet 200 is disposed. The two axis pins 242, 244 about which the first magnet 200 rotates within the casing 240 are shown. The cut-away 246 in the casing 240 enables the lever arm 230 to push on the casing and cause it to rotate. The casings for the second and third magnets 202, 204 do not have the cut-away 246. They simply rotate about their axis pins.

Some comments about algorithms used by the sensor system to detect the stylus are useful to discuss in more detail to enable those skilled in the art to practice the invention. Several algorithms have been implemented, each with its advantages and disadvantages.

The first algorithm to be developed is the angular triangulation method that used vectors. The problem with this method is that when an angle becomes small, the error in the equations increases rapidly. Thus, when the stylus is near one of the sensors, the error increases to the point that determination of the position of the stylus tip becomes very inaccurate. The method works well when the stylus stays away from the sensors, and remains between them. This method is also very sensitive to pen tilt because there is very little if any 3D capability in the equations.

The next method uses Maxwell's equations. An element of the equations is a magnetic constant for the magnets being used in the stylus. This magnetic constant is the dipole moment. The dipole moment is fixed as a constant in the equations to make them easier to use. But the value is only an estimate. This next method can be referred to as the magnitude method. The magnitude method generates an equation for a circle, the center of the circle being the location of the sensor, and the stylus tip being defined as a point on the circle. Two sensors means that equations for two circles are generated that must intersect. The two equations are solved for two unknowns to determine the location of the stylus tip. Advantageously, there are some 3D elements in the equations that make this method less sensitive to tilting of the pen. In addition, when the stylus gets too close to one of the sensors, the equations for the other sensor become highly accurate and can compensate for errors. But when the stylus is closer than one half inch to a sensor, the equations begin to break down. This is because the circles are supposed to intersect, and because this method uses estimates in Maxwell's equations, it is sometimes the case where one circle is completely within another circle. With no intersection, the equations fail completely. This method also does not work well when the stylus is tipping toward the sensors.

The next method is a modification of the magnitude method. In this case, the method includes mathematical compensation for when the stylus is tipped toward the sensors. Otherwise, the method is the same.

The next method is a substantial increase in complexity over the previous methods, but it yields surprisingly more accurate results. This method will be referred to as the field line method, or the 3D dipole triangulation method, and it also uses two equations to solve two unknowns. This method uses the full 3D equations of Maxwell. The full equations are more difficult to solve because they require more steps. In this method, the equations are trying to determine the shape or surface of the field lines of the stylus in order to determine the location of the stylus tip. In other words, the algorithm is trying to find a best fit curve. Because the equations are not closed, an iterative answer is obtained in a method similar to a binary search that closes in on the correct values. In this embodiment, the algorithm utilizes approximately 50 iterations at most to close in on the solution to the equations.

This embodiment has used a neural net as well as a Fourier series to solve the equations. The more elements used in the Fourier series, the faster the solution is reached. The tradeoff is the number of calculations that must be performed. Using a neural net, the algorithm finds a best case approximation of the field lines to create a function that describes them. The algorithm converges on a solution using a gradient descent.

Unfortunately, this method can often get trapped in a local minima. However, it is possible to simply throw out these wrong answers using an error checking routine. In other words, if the stylus tip location suddenly jumps to a new one that is beyond a certain distance, the answer is thrown out and recalculated using new data. It should be realized that there is no approximation in this method. It can be used to find the location of the stylus tip down to a very small margin of error. While the algorithm may take 50 iterations, it sometimes gets lucky and finds the correct answer earlier as well. This method can give the 3D location of the stylus tip, and handles any type of stylus tipping.

Alternatively, this method can use the last calculated position as a beginning point for the next set of calculations. If the calculations get trapped in a local minima, then they can be thrown out and the position can be determined without using the last known position.

The last method is similar, but relies on three sensors instead of two sensors used in the algorithms above. Three sensors will increase the cost of the system, but the equations become extremely simple. With three sensors, the system now has the intersection of three planes at the stylus tip. Thus, the algorithm is the planar method that doesn't use Maxwell's equations. Instead, the algorithm utilizes linear algebra to find the intersection of three planes. This method is not iterative, and is of a closed form.

It is observed that these methods all assume that the Z plane is fixed as the writing surface. This works well when the user writes, for example, in front of a PDA or laptop. But when the user wants to write on an LCD screen of the laptop and have the inking appear, compensation must be used to fix the Z plane a certain distance above the assume writing surface. The LCD screen of the laptop or PDA would have to be level. This may be a calibration issue that is used to solve this distance problem.

FIGS. 22, 23, 24, and 25 are provided as detailed schematic circuit diagrams that illustrate the sensor system in great detail.

It is noted that by turning the stylus upside down, the permanent magnet(s) in the stylus change polarity. This change in polarity can be detected as a relatively slow movement, not interpreted to be a signal indicating inking and non-inking. The software can use this to erase what was written in the vicinity of the erasing end of the stylus.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A passive stylus system for providing input to an electronic appliance, wherein the passive stylus utilizes a permanent magnet to provide passive stylus location information to a magnetic sensor system, said passive stylus system comprising:
   a passive stylus including at least one permanent magnet;
   a magnetic sensor system including a plurality of magnetic field sensors having circuitry that enables subtraction of the magnetic field of the passive stylus from the earth's relative magnetic field to thereby obtain vector information that is used to triangulate a location of the at least one permanent magnet disposed within the passive stylus relative to an area of operation, wherein the magnetic sensor system utilizes solid state magnetic sensor technology; and
   an electronic appliance for receiving input from the magnetic sensor system regarding the location of the at least one permanent magnet within the area of operation, wherein the input is interpreted to be alphanumerical text, cursor control, or graphical data.

2. The passive stylus system as defined in claim 1 wherein the plurality of magnetic field sensors are capable of (1) detecting the at least one permanent magnet, (2) determining a location of the at least one permanent magnet relative to at least one reference point, and (3) transmitting the location of the at least one permanent magnet relative to the reference point to the electronic appliance.

3. The passive stylus system as defined in claim 2 wherein the plurality of magnetic field sensors are further comprised of two pairs of magnetic field sensors, to thereby provide x axis and y axis coordinate information.

4. The passive stylus system as defined in claim 3 wherein the plurality of magnetic field sensors are further comprised of a third pair of magnetic field sensors that provide z axis coordinate information.

5. The passive stylus system as defined in claim 3 wherein the plurality of magnetic field sensors are capable of determining if the passive stylus is oriented such that a stylus tip is being used within the area of operation, or an end opposite the stylus tip is being used within the area of operation, to thereby determine if the passive stylus is being used to generate input, or delete input.

6. The passive stylus system as defined in claim 3 wherein each of the plurality of magnetic field sensors further comprises:
   a polarizing coil for changing a direction of sensitivity;
   a null coil for obtaining a zero magnetic field on the magnetic field sensor to thereby increase gain while maintaining linearity; and
   a flipping coil.

7. The passive stylus system as defined in claim 6 wherein the plurality of magnetic field sensors operate with a bandwidth of approximately 1 volt DC to approximately 1 MHz.

8. The passive stylus system as defined in claim 7 wherein each of the plurality of magnetic field sensors further comprises a bridge circuit.

9. The passive stylus system as defined in claim 3 wherein the passive stylus system further comprises a display device, wherein the display device shows the alphanumerical text, the cursor control, or the graphical data as input from the passive stylus system.

10. The passive stylus system as defined in claim 3 wherein the electronic appliance is selected from the group of electronic appliances comprised of a mobile telephone, a personal digital assistant, a desktop computer, and a laptop computer.

11. The passive stylus system as defined in claim 3 wherein the passive stylus system further comprises data processing capabilities, wherein the passive stylus system determines the location of the passive stylus by utilizing a circular triangulation formula, wherein data from the plurality of magnetic field sensors is utilized in the circular triangulation formula to reduce inaccuracies in passive stylus position determination due to inclination or movement of the passive stylus that is not intended to generate input.

12. The passive stylus system as defined in claim 3 wherein the passive stylus further comprises:
   a stylus body f or housing components of the passive stylus; an ink cartridge;
   a rapid movement system for rapidly moving the at least one permanent magnet within the stylus body when the ink cartridge moves into or out of the stylus body, movement of the ink cartridge into the stylus body being caused when the stylus tip of the passive stylus is pressed down onto a writing surface, and movement of the ink cartridge out of the stylus body being caused by lifting of the stylus tip off the writing surface; and wherein the rapid movement system moves the at least one permanent magnet in a manner that is detectable by the plurality of magnetic field sensors and is indicative of input beginning or ending, and wherein the rapid movement is distinguishable from normal writing motions.

13. The passive stylus system as defined in claim 3 wherein the passive stylus further comprises:
   a stylus body for housing components of the passive stylus;
   a pencil cartridge;
   a rapid movement system for rapidly moving the at least one permanent magnet within the stylus body when the pencil cartridge moves into or out of the stylus body, movement of the pencil cartridge into the stylus body being caused when the stylus tip of the passive stylus is pressed down onto a writing surface, and movement of the pencil cartridge out of the stylus body being caused by lifting of the stylus tip off the writing surface; and wherein the rapid movement system moves the at least one permanent magnet in a manner that is detectable by the plurality of magnetic field sensors and is indicative of input beginning or ending, and wherein the rapid movement is distinguishable from normal writing motions.

14. The passive stylus system as defined in claim 12 wherein the passive stylus further comprises:
   an actuator disposed on a non-inking end of the ink cartridge;
   at least one position magnet disposed adjacent to an inking end of the ink cartridge, having a hole through which the ink cartridge is disposed;
   a spring disposed around the ink cartridge, and between the at least one position magnet and a stylus tip;
   a trigger magnet disposed above a non-inking end of the ink cartridge, and having a hole through which the actuator can pass;
   a ferrous washer disposed above the trigger magnet, the ferrous washer having an outer shelf and an inner conical depression in a surface thereof; and a signaling magnet disposed at rest so as to be inclined, a bottom surface disposed at least partially at rest against the inner conical depression, wherein the ink cartridge will push the signaling magnet from an inclined position to an upright position so that the bottom surface of the signaling magnet is at least partially at rest against the outer shelf.

15. A passive stylus system for providing input to an electronic appliance, wherein the passive stylus utilizes a permanent magnet to provide passive stylus location information to a magnetic sensor system, said passive stylus system comprising:
   a passive stylus including at least one permanent magnet;
   a plurality of magnetic field sensor pairs having circuitry that enables subtraction of the magnetic field of the passive stylus from the earth's relative magnetic field to thereby obtain vector information that is used to triangulate a location of the at least one permanent magnet disposed within the passive stylus, relative to an area of operation;
   an electronic appliance for receiving input from the magnetic sensor system regarding the location of the at least one permanent magnet within the area of operation, wherein the input is interpreted to be alphanumerical text, cursor control, or graphical data; and
   a display screen for displaying information, including the input from the passive stylus.

16. The passive stylus system as defined in claim 15 wherein the system further comprises an alphanumerical keyboard, said keyboard being disposed relative to the plurality of magnetic field sensors to thereby enable detection of a stylus tip of the passive stylus on the keyboard, to thereby enable input of alphanumerical data into the electronic appliance.

17. A method for providing input to an electronic appliance utilizing a passive stylus system that incorporates a permanent magnet, said method comprising the steps of:
   (1) providing a passive stylus having at least one permanent magnet disposed therein, and a magnetic sensor system having a plurality of magnetic field sensor pairs;
   (2) determining a plurality of positions of the at least one permanent magnet by subtracting the magnetic field of the passive stylus from the earth's relative magnetic field and then obtaining vector information that is used to triangulate the positions of the at least one permanent magnet;
   (3) determining the plurality of positions of the at least one permanent magnet relative to a reference point; and
   (4) transmitting the positions of the at least one permanent magnet in the passive stylus, wherein the plurality of positions are interpreted to be alphanumerical text, cursor control, or graphical data.

18. The method as defined in claim 17 wherein the method further comprises the steps of:
   (1) utilizing a first pair of the plurality of magnetic field sensors to determine a first vector;
   (2) utilizing a second pair of the plurality of magnetic field sensors to determine a second vector; and
   (3) generating x axis and y axis coordinate information for the positions of the at least one permanent magnet in the passive stylus.

19. The method as defined in claim 18 wherein the method further comprises the steps of:
   (1) utilizing a third pair of the plurality of magnetic field sensors to determine a third vector; and
   (2) generating z axis coordinate information for the positions of the at least one permanent magnet in the passive stylus.

20. The method as defined in claim 18 wherein the method further comprises the steps of:
   (1) determining if the passive stylus is oriented such that a stylus tip is being operated within an area of operation;
   (2) determining if the passive stylus is oriented such that an end opposite the stylus tip is being operated within the area of operation; and
   (3) generating input if the stylus tip is being operated within an area of operation and the passive stylus is actuated.

21. The method as defined in claim 20 wherein the method further comprises the step of deleting input if the end opposite the stylus tip is being operated within the area of operation and the passive stylus is actuated to delete input.

22. The method as defined in claim 21 wherein the method further comprises the steps of:
   (1) polarizing a coil within each of the plurality of magnetic field sensors to thereby change a direction of sensitivity; and
   (2) actuating a null coil within each of the plurality of magnetic field sensors to thereby obtain a zero magnetic field on the magnetic field sensor to thereby increase gain while maintaining linearity.

23. The method as defined in claim 22 wherein the method further comprises the step of providing a display device associated with the electronic appliance, to thereby display the alphanumerical text, the cursor control, or the graphical data as input from the passive stylus system.

24. The method as defined in claim 23 wherein the method further comprises the step of processing the vectors utilizing a circular triangulation equation, wherein data from the plurality of magnetic field sensors is utilized in the circular triangulation equation to reduce inaccuracies in passive stylus position determination due to inclination or movement of the passive stylus that is not intended to generate input.

25. The method as defined in claim 24 wherein the method further comprises the steps of:
   (1) providing a stylus body for housing components of the passive stylus, an ink cartridge, and a rapid movement system;
   (2) rapidly moving the at least one permanent magnet within the stylus body when the ink cartridge moves into or out of the stylus body, wherein movement of the ink cartridge into the stylus body is caused when the stylus tip of the passive stylus is pressed down onto a writing surface, and wherein movement of the ink cartridge out of the stylus body is caused by lifting of the stylus tip off the writing surface;
   (3) utilizing input from the plurality of magnetic field sensors when rapid movement of the at least one permanent magnet is detected when the stylus tip is pressed down onto a writing surface; and
   (4) ceasing to utilize input from the plurality of magnetic field sensors when rapid movement of the at least one permanent magnet is detected when the stylus tip is removed from the writing surface.

26. The method as defined in claim 24 wherein the method further comprises the steps of:
   (1) providing a stylus body for housing components of the passive stylus, an pencil cartridge, and a rapid movement system;

(2) rapidly moving the at least one permanent magnet within the stylus body when the pencil cartridge moves into or out of the stylus body, wherein movement of the pencil cartridge into the stylus body is caused when the stylus tip of the passive stylus is pressed down onto a writing surface, and wherein movement of the pencil cartridge out of the stylus body is caused by lifting of the stylus tip off the writing surface;

(3) utilizing input from the plurality of magnetic field sensors when rapid movement of the at least one permanent magnet is detected when the stylus tip is pressed down onto a writing surface; and (4) ceasing to utilize input from the plurality of magnetic field sensors when rapid movement of the at least one permanent magnet is detected when the stylus tip is removed from the writing surface.

27. The method as defined in claim 26 wherein the method further comprises the step of providing an actuator disposed on a non-inking end of the ink cartridge, at least one position magnet disposed adjacent to an inking end of the ink cartridge having a hole through which the ink cartridge is disposed, a spring disposed around the ink cartridge and between the at least one position magnet and a stylus tip, a trigger magnet disposed above a non-inking end of the ink cartridge and having a hole through which the actuator can pass, a ferrous washer disposed above the trigger magnet wherein the ferrous washer has an outer shelf and an inner conical depression in a surface thereof, and a signaling magnet disposed at rest so as to be inclined, a bottom surface disposed at least partially at rest against the inner conical depression, wherein the ink cartridge will push the signaling magnet from an inclined position to an upright position so that the bottom surface of the signaling magnet is at least partially at rest against the outer shelf.

* * * * *